(12) United States Patent
Park

(10) Patent No.: US 7,445,725 B2
(45) Date of Patent: Nov. 4, 2008

(54) SURFACE BONDING IN HALOGENATED POLYMERIC COMPONENTS

(75) Inventor: Edward Hosung Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 11/636,693

(22) Filed: Dec. 8, 2006

(65) Prior Publication Data
US 2007/0095790 A1 May 3, 2007

Related U.S. Application Data

(62) Division of application No. 10/881,129, filed on Jun. 30, 2004, now abandoned.

(51) Int. Cl.
*B44C 1/22* (2006.01)
(52) U.S. Cl. .................................................. 216/63
(58) Field of Classification Search .................. None
See application file for complete search history.

(56) References Cited

U.S. PATENT DOCUMENTS

| | | | |
|---|---|---|---|
| 2,968,649 A | 1/1961 | Pailthrop et al. | |
| 2,972,600 A | 2/1961 | Braidwood | |
| 3,287,440 A | 11/1966 | Giller | |
| 3,616,371 A | 10/1971 | Ukihashi et al. | |
| 3,801,552 A | 4/1974 | Kometani et al. | |
| 4,035,565 A | 7/1977 | Apotheker et al. | |
| 4,054,455 A | 10/1977 | Schlesinger et al. | |
| 4,129,617 A | 12/1978 | Machi et al. | |
| 4,233,421 A | 11/1980 | Worm | |
| 4,358,559 A | 11/1982 | Holcomb et al. | |
| 4,446,270 A | 5/1984 | Guenthner et al. | |
| 4,483,951 A | 11/1984 | Brenner | |
| 4,491,536 A | 1/1985 | Tomoda et al. | |
| 4,497,935 A | 2/1985 | St. Clair et al. | |
| 4,507,342 A * | 3/1985 | Kielbania, Jr. ............. 428/90 |
| 4,542,573 A | 9/1985 | Bainard | |
| 4,564,662 A | 1/1986 | Albin | |
| 4,566,927 A | 1/1986 | Wood | |

(Continued)

FOREIGN PATENT DOCUMENTS

CA 2509656 12/2005

(Continued)

OTHER PUBLICATIONS

Worm, A. and Grootaert, W. "Fluorocarbon Elastomers," Encyclopedia of Polymer Science and Technology, vol. 2. Article Online Posting Date: Oct. 22, 2001.

(Continued)

*Primary Examiner*—Allan Olsen
(74) *Attorney, Agent, or Firm*—Ronald W. Wangerow; Harness, Dickey & Pierce, P.L.C.

(57) ABSTRACT

Etching the surface (activating the surface) of a halogenated polymer component with an electron beam generates a set of free radical sites in polymeric chains of the surface that sustain for at least 4 hours in an inert environment. The inert environment is provided by a noble gas, nitrogen, a static free space, and/or a vacuum. Items such as dynamic seals, static seals, gaskets, pump diaphragms, hoses, and o-rings all benefit from precursors made according to the technique.

8 Claims, 3 Drawing Sheets

U.S. PATENT DOCUMENTS

| | | | |
|---|---|---|---|
| 4,688,306 A | 8/1987 | Soni et al. | |
| 4,705,741 A | 11/1987 | Lewis et al. | |
| 4,808,665 A | 2/1989 | Patel et al. | |
| 4,849,040 A | 7/1989 | Wood | |
| 4,912,171 A | 3/1990 | Grootaert et al. | |
| 4,985,520 A | 1/1991 | Hayashi et al. | |
| 5,015,526 A | 5/1991 | Kubo et al. | |
| 5,055,539 A | 10/1991 | Hengel et al. | |
| 5,057,345 A | 10/1991 | Barrett | |
| 5,262,490 A | 11/1993 | Kolb et al. | |
| 5,266,400 A | 11/1993 | Yarusso et al. | |
| 5,332,769 A | 7/1994 | Kakimoto et al. | |
| 5,338,588 A | 8/1994 | Billiu | |
| 5,354,811 A | 10/1994 | Kamiya et al. | |
| 5,409,777 A * | 4/1995 | Kennedy et al. | 428/411.1 |
| 5,523,115 A | 6/1996 | Haidos et al. | |
| 5,530,264 A * | 6/1996 | Kataoka et al. | 257/40 |
| 5,565,284 A | 10/1996 | Koga et al. | |
| 5,591,551 A | 1/1997 | Audett et al. | |
| 5,614,577 A | 3/1997 | Sasaki et al. | |
| 5,730,922 A * | 3/1998 | Babb et al. | 264/258 |
| 5,741,855 A | 4/1998 | Kaduk et al. | |
| 5,843,340 A | 12/1998 | Silvi et al. | |
| 5,883,151 A | 3/1999 | Raetzsch et al. | |
| 5,897,794 A | 4/1999 | Hubbard et al. | |
| 5,952,243 A | 9/1999 | Forester et al. | |
| 5,969,066 A | 10/1999 | Enokida et al. | |
| 5,985,949 A | 11/1999 | Seguchi et al. | |
| 6,043,308 A | 3/2000 | Tanahashi et al. | |
| 6,080,450 A | 6/2000 | Cantor | |
| 6,114,079 A | 9/2000 | Christian et al. | |
| 6,169,125 B1 | 1/2001 | Arnold | |
| 6,177,238 B1 | 1/2001 | Fuller et al. | |
| 6,207,758 B1 | 3/2001 | Brinati et al. | |
| 6,228,943 B1 | 5/2001 | Morikawa et al. | |
| 6,284,412 B1 | 9/2001 | Minakata et al. | |
| 6,323,301 B1 | 11/2001 | Smith et al. | |
| 6,331,586 B1 | 12/2001 | Thielen et al. | |
| 6,358,670 B1 * | 3/2002 | Wong et al. | 430/296 |
| 6,365,250 B2 | 4/2002 | Shifman et al. | |
| 6,419,615 B1 | 7/2002 | Chen et al. | |
| 6,437,014 B1 | 8/2002 | Ho et al. | |
| 6,482,522 B1 | 11/2002 | Parsonage et al. | |
| 6,486,481 B1 | 11/2002 | Tigera | |
| 6,489,420 B1 | 12/2002 | Duchesne et al. | |
| 6,517,657 B1 | 2/2003 | Kuenzel et al. | |
| 6,517,663 B1 | 2/2003 | Kelley et al. | |
| 6,533,955 B1 | 3/2003 | Molnar et al. | |
| 6,602,959 B2 | 8/2003 | Vestberg et al. | |
| 6,624,251 B1 | 9/2003 | Chmielewski | |
| 6,652,943 B2 | 11/2003 | Tukachinsky et al. | |
| 6,812,624 B1 | 11/2004 | Pei et al. | |
| 6,814,584 B2 | 11/2004 | Zaderej | |
| 6,823,903 B2 | 11/2004 | Davis | |
| 6,838,039 B2 | 1/2005 | Morioka et al. | |
| 6,849,314 B2 | 2/2005 | Jing et al. | |
| 6,875,394 B2 | 4/2005 | Soulier | |
| 6,946,522 B2 | 9/2005 | Jacob et al. | |
| 7,135,122 B2 | 11/2006 | Park | |
| 7,230,038 B2 | 6/2007 | Park | |
| 7,244,329 B2 | 7/2007 | Park et al. | |
| 7,342,072 B2 | 3/2008 | Park et al. | |
| 2002/0198320 A1 | 12/2002 | Chmielewski | |
| 2003/0004257 A1 | 1/2003 | Kondo et al. | |
| 2003/0083616 A1 | 5/2003 | Lee et al. | |
| 2003/0125466 A1 | 7/2003 | Chmielewski | |
| 2004/0126523 A1 | 7/2004 | Masuda et al. | |
| 2004/0157035 A1 | 8/2004 | Guizzetti et al. | |
| 2004/0181022 A1 | 9/2004 | Saito et al. | |
| 2004/0201926 A1 * | 10/2004 | Hancer et al. | 360/294.4 |
| 2005/0081989 A1 | 4/2005 | Berezuk et al. | |
| 2005/0154136 A1 | 7/2005 | Dharia et al. | |
| 2005/0164127 A1 * | 7/2005 | Reid et al. | 430/311 |
| 2006/0000801 A1 | 1/2006 | Park | |
| 2006/0003126 A1 | 1/2006 | Park et al. | |
| 2006/0003127 A1 | 1/2006 | Park et al. | |
| 2006/0004117 A1 | 1/2006 | Park | |
| 2006/0004142 A1 | 1/2006 | Park et al. | |
| 2006/0004147 A1 | 1/2006 | Park et al. | |
| 2007/0036980 A1 | 2/2007 | Park | |
| 2007/0092731 A1 | 4/2007 | Park et al. | |
| 2007/0093605 A1 | 4/2007 | Adur | |
| 2007/0213423 A1 | 9/2007 | Park | |

FOREIGN PATENT DOCUMENTS

| | | |
|---|---|---|
| CA | 2509675 | 12/2005 |
| CA | 2509703 | 12/2005 |
| EP | 0509373 | 10/1992 |
| EP | 1254936 | 11/2002 |
| JP | 61168649 | 7/1986 |
| WO | WO 96/07695 | 3/1996 |
| WO | WO 98/31541 | 7/1998 |
| WO | WO 01/02508 | 1/2001 |
| WO | WO 02/42372 | 5/2002 |
| WO | WO 2005/012410 | 2/2005 |

OTHER PUBLICATIONS

Electron-Beam Curing of Polymeric Composites as an Enabling Technology for Advanced Manufacturing, E-Beam Services, Inc., presented at Internatl Composites Expo May 10-13, 1999.

Electron-Beam Processing of Plastics: An Alternative to Chemical Additives, E-Beam Services, Inc., Presented at 58th SPE Annual Technology Conf May 11, 2000.

Kenji Nagai Figure from "Technical Issues and Counter Measures for FKM", Industrial Material, pp. 62-65, vol. 44, No. 3 Mar. 1996.

MatWeb Material Data Sheet—Fluorel FE-5830Q http://www.matweb.com.

MatWeb Material Data Sheet—Fluorel FT-2350 http://www.matweb.com.

* cited by examiner

SURFACE BONDING IN HALOGENATED POLYMERIC COMPONENTS

CROSS REFERENCE TO RELATED APPLICATION

This application is a divisional of U.S. patent application Ser. No. 10/881,129 filed on Jun. 30, 2004, the disclosure of which is incorporated herein by reference.

INTRODUCTION

This invention relates to articles formed from at least one halogenated polymer component having an activated surface. In particular, the present invention relates to activating halogenated polymer component surfaces with radiation.

Composites are important materials in enabling many of the benefits of modern life. Composites provide multilayered structures having individual layers made of metal, polymer, or ceramic. Each layer contributes to the overall performance of the composite as viewed from the intended application. This is especially true of the outside layers of a composite.

Halogenated polymer layers bring useful performance properties to composites. However, halogenated polymer layers are also challenging to bond into composites. What is needed is a way to bond a layer made of halogenated polymer to other materials while retaining the desired properties of the halogenated polymer layer. This and other needs are achieved with the invention.

SUMMARY

The invention provides a method for etching an article made of halogenated polymer, comprising
 (a) etching a surface of the article with an electron beam; and
 (b) placing the surface in an inert environment at a predetermined temperature;
where the electron (bombardment) beam energizes the surface with sufficient energy for dislodging a plurality of halogen atoms from the halogenated polymer of the surface and for generating thereby a set of initial residual free radical sites in polymeric chains of the surface upon conclusion of the etching, and the inert environment and the predetermined temperature are sufficient for sustaining at least 99 percent of the free radical sites of the set of initial residual free radical sites for at least 4 hours.

In one form of the invention, the inert environment is a noble gas. In one form of this, the inert environment is a noble gas at a pressure of less than 0.1 atmospheres. In another form of the invention, the inert environment is nitrogen. In yet another aspect, a vacuum is applied to the etched material surface. In yet another aspect, a static free environment as a space free of static is enabled at the etched material surface.

In one form of the invention, the electron beam radiation is generated of from about 0.1 MeRAD to about 40 MeRAD (preferably, from about 5 MeRAD to about 20 MeRAD).

In one form of the invention, an etched halogenated polymer precursor component is made for use in making an article such as a dynamic seal, a static seal, a gasket, a pump diaphragm, a hose, or an o-ring.

Further areas of applicability will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWINGS

The present invention will become more fully understood from the detailed description and the accompanying drawings of FIGS. 1 to 4.

Figure 1:
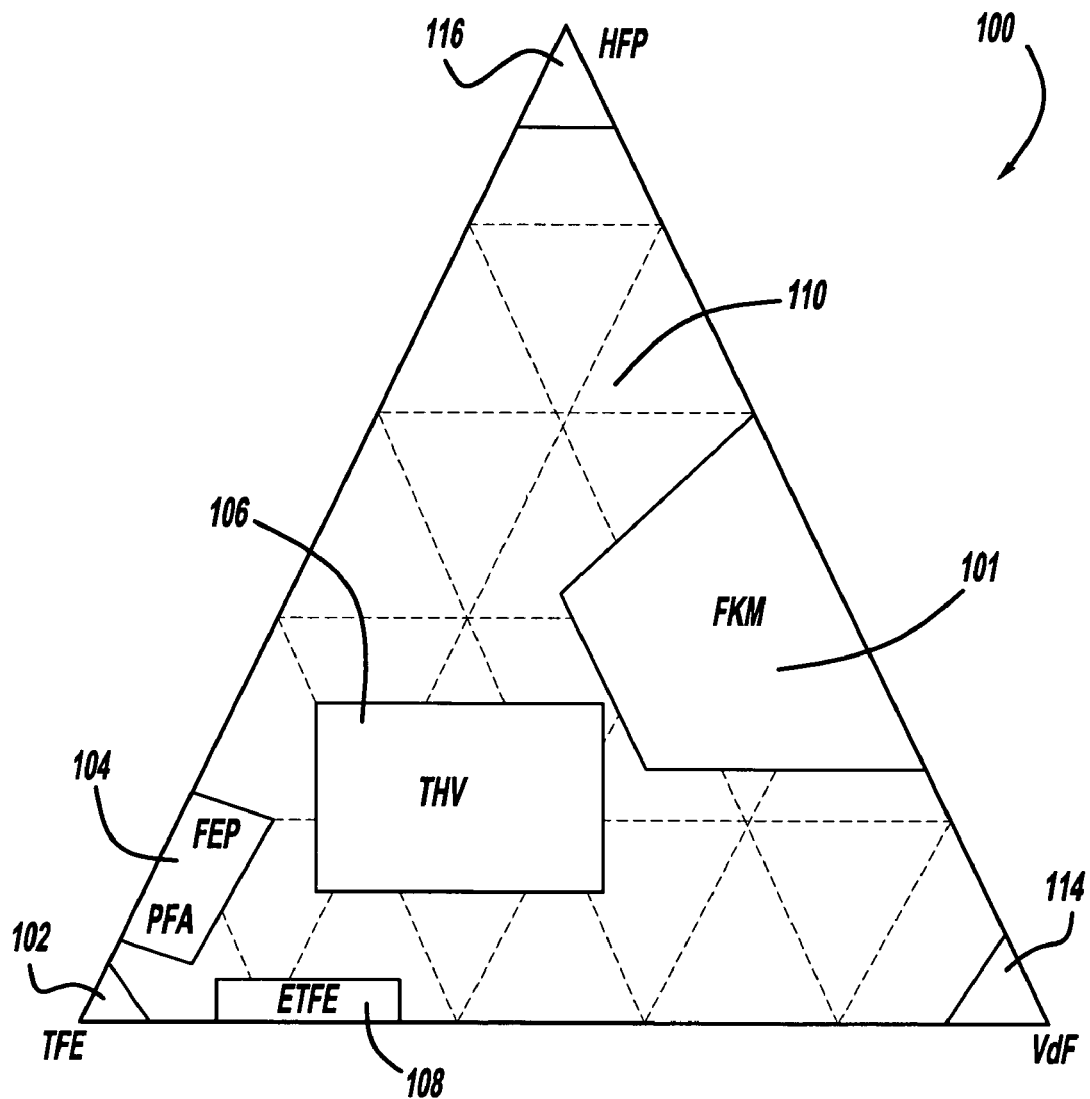
FIG. 1 presents a ternary composition diagram for tetrafluoroethylene (TFE), hexfluoropropylene (HFP), and vinylidene fluoride blends.

It should be noted that the figures set forth herein are intended to exemplify the general characteristics of an apparatus, materials, and methods among those of this invention, for the purpose of the description of such embodiments herein. The figures may not precisely reflect the characteristics of any given embodiment, and are not necessarily intended to define or limit specific embodiments within the scope of this invention.

DESCRIPTION

The following definitions and non-limiting guidelines must be considered in reviewing the description of this invention set forth herein.

The headings (such as "Introduction" and "Summary") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations the stated of features.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

Most items of manufacture represent an intersection of considerations in both mechanical design and in materials design. In this regard, improvements in materials frequently are intertwined with improvements in mechanical design. The embodiments describe compounds, compositions, assemblies, and manufactured items that enable improvements in irradiation-augmented polymer material synthesis to be fully exploited.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

The embodiments relate to synthetic polymer chains (especially materials having a halogenated polymer phase or portion) from a process initiated with free radical formation derived from irradiation (especially electron beam radiation) of an element (preferably a halogen element) connected to a polymer chain.

Carbon-chain-based polymeric materials (polymers) are usefully defined as falling into one of three traditionally separate generic primary categories: thermoset materials (one type of plastic), thermoplastic materials (a second type of plastic), and elastomeric (or rubber-like) materials (elastomeric materials are not generally referenced as being "plastic" insofar as elastomers do not provide the property of a solid "finished" state). An important measurable consideration with respect to these three categories is the concept of a melting point—a point where a solid phase and a liquid phase of a material co-exist. In this regard, a thermoset material essentially cannot be melted after having been "set" or "cured" or "cross-linked". Precursor component(s) to the thermoset plastic material are usually shaped in molten (or essentially liquid) form, but, once the setting process has executed, a melting point essentially does not exist for the material. A thermoplastic plastic material, in contrast, hardens into solid form (with attendant crystal generation), retains its melting point essentially indefinitely, and re-melts (albeit in some cases with a certain amount of degradation in general polymeric quality) after having been formed. An elastomeric (or rubber-like) material does not have a melting point; rather, the elastomer has a glass transition temperature where the polymeric material demonstrates an ability to usefully flow, but without co-existence of a solid phase and a liquid phase at a melting point.

Elastomers are frequently transformed into very robust flexible materials through the process of vulcanization. Depending upon the degree of vulcanization, the glass transition temperature may increase to a value that is too high for any practical attempt at liquefaction of the vulcanizate. Vulcanization implements inter-bonding between elastomer chains to provide an elastomeric material more robust against deformation than a material made from the elastomers in their pre-vulcanized state. In this regard, a measure of performance denoted as a "compression set value" is useful in measuring the degree of vulcanization ("curing", "cross-linking") in the elastomeric material. For the initial elastomer, when the material is in non-vulcanized elastomeric form, a non-vulcanized compression set value is measured according to ASTM D395 Method B and establishes thereby an initial compressive value for the particular elastomer. Under extended vulcanization, the elastomer vulcanizes to a point where its compression set value achieves an essentially constant maximum respective to further vulcanization, and, in so doing, thereby defines a material where a fully vulcanized compression set value for the particular elastomer is measurable. In applications, the elastomer is vulcanized to a compression set value useful for the application.

Augmenting the above-mentioned three general primary categories of thermoset plastic materials, thermoplastic plastic materials, and elastomeric materials are two blended combinations of thermoplastic and elastomers (vulcanizates) generally known as TPEs and TPVs. Thermoplastic elastomer (TPE) and thermoplastic vulcanizate (TPV) materials have been developed to partially combine the desired properties of thermoplastics with the desired properties of elastomers. As such, TPE and TPV materials are usually multi-phase admixtures of elastomer (vulcanizate) in thermoplastic. Traditionally, the elastomer (vulcanizate) phase and thermoplastic plastic phase co-exist in phase admixture after solidification of the thermoplastic phase; and the admixture is liquefied by heating the admixture above the melting point of the thermoplastic phase of the TPE or TPV.

Another form of modification to the traditional three general primary categories of thermoset plastic materials, thermoplastic plastic materials, and elastomeric materials is cross-linked thermoplastic material, where a thermoplastic undergoes a certain degree of cross-linking via a treatment such as irradiation after having been solidified (to contain crystals of the thermoplastic polymer). In this regard, while the melting point of crystals in a cross-linked thermoplastic is sustained in all crystalline portions of the thermoplastic, the dynamic modulus of the cross-linked thermoplastic will be higher than that of the non-crosslinked thermoplastic due to crosslinkage between thermoplastic molecules in the amorphous phase of the thermoplastic.

Some embodiments of this specification derive from the inter-linking of molecules of an elastomer or vulcanizate with molecules of a thermoplastic. In this regard, a new type of compound is formed: a molecule (usually a macromolecule) having one moiety (significant portion or significant sub-molecular part of a molecule) derived from an elastomer or vulcanizate and a second moiety derived from a plastic. In some embodiments, the plastic moiety is derived from thermoplastic plastic; in other embodiments, the plastic is derived from thermoset plastic.

Some further embodiments of this specification derive from the inter-linking of molecules of an elastomer or vulcanizate with molecules of a ceramic compound. In this regard, a new type of compound is formed: a molecule (usually a macromolecule) having one moiety (significant portion or significant sub-molecular part of a molecule) derived from an elastomer or vulcanizate and a second moiety derived from a ceramic compound.

Other embodiments of this specification derive from the inter-linking of molecules of an elastomer or vulcanizate with a metal element. In this regard, a molecule (usually a macromolecule) having a metal element bonded to an elastomer or vulcanizate provides a new form of elastomer. In this regard, it is to be noted that a traditional practice of bonding an elastomer or vulcanizate to a metal employs a silane-derived group to conjoin a metallic silane to the elastomer with hydrogen bonds or van der Waals forces.

In one embodiment, the elastomeric moiety is generated from bombarding an elastomeric molecule with a beam of energy that is sufficiently significant to dislodge an element (preferably a halogen element such as fluorine) from the carbon chain of the elastomer but sufficiently mitigated to avoid breaking or severing of the chain. After the element (halogen or other element) is dislodged, a free radical derivative of the original elastomeric molecule exists with a free radical site on the element (usually carbon) in the polymer chain to which the dislodged element (the halogen, usually) was previously bonded. While free-radicals usually react very rapidly with other materials (indeed, they are frequently referenced as very short-term intermediary entities in kinetic models describing rapidly-executed multistage chemical reactions), a free radical polymer chain appears to be surprisingly stable in the free radical state, especially if the polymeric free radical is constrained from movement and also constrained from contact with other materials that would bond to the free radical site of the polymer chain. Indeed, the stability of such free radical sites on polymer chains is surprising when a halogenated polymer is irradiated with electron beam radiation to energize a halogen element on the polymer with energy sufficient to remove that halogen from the polymer and thereby generate a free radical site on the polymer chain. A preferred method of generating the free radical site(s) is with an electron beam.

It is known that modifications in polymeric structures are effected by radiation. The radiation is alternatively radioactively sourced, laser sourced, or sourced by an electron accelerator. After irradiation of the polymer molecules, the polymer chains are modified to include dangling bonds between the atoms of the polymer chains or to have broken, bent, or strained chains. Irradiative treatment can also generate either free radicals or high-energy chemical bonds in molecules of admixed polymers. These bonds include covalent and ionic bonds as well as those other bonds created by electronic or electrostatic attraction (for example, Van der Waal's forces). And it has been shown that another polymeric item may be bonded to the irradiated polymeric structure without further use of adhesives.

In a preferred embodiment, the above considerations are the basis for an approach that first generates free radical or reduced sites (in the context of "reduction" meaning the loss of an electron, a reduced site is a site having an electron deficient shell state on any element in the polymeric chain—the "chain element"—where the site is generated by removing an electron from the "chain" element to, in essence, "reduce" that "chain" element to a higher energy state respective to the residual unpaired electron still remaining in orbital association with the "chain" element after the removal of the electron with which the remaining electron was paired) on both an elastomer and also in a second material. In this regard, it should be noted that the "chain" element (possessing the free radical site) lost the electron that reduced the site when that electron departed from the polymeric chain with the "removed" element that was energized to the point where it separated from the "chain" element. The second material may be a metal, a ceramic compound, or a thermoplastic polymer. The two free radicals (or free radical elastomer derivative and "reduced" metal element) are then positioned (or retained in a position usefully appropriate by virtue of their positioning prior to irradiation) and further energized as needed so that (a) the free radical elastomer molecule (derived from the elastomer) and (b) the respective second free-radical or reduced bond site of any of the free radical ceramic molecule, free radical thermoplastic molecule, or reduced metal element bond together at their respective high energy electron sites (free radical sites or reduced sites) to yield a new molecule having one moiety derived from the free radical elastomer and a second moiety from the selected non-elastomer (such as any of the free radical thermoplastic molecule, the free radical ceramic compound, or the reduced metal element). As should also be appreciated, the amount of energy is also controlled to minimize destruction of the polymeric chains upon which free radical sites are being generated. In this regard, it is efficacious in the new molecules of the embodiments for the free radical sites to be at interim locations on the polymer chains rather than at endpoints where the initial polymer chains were severed or broken by the radiation.

With respect to the bonding, the size of the free-radical molecules (molecular weight of from about 350 to about 10,000,000 for the free radical elastomer molecule, and from about 120 to about 10,000,000 for a free radical thermoplastic molecule when the non-elastomer is a thermoplastic molecule) is also desired for providing optimal mobility of the free-radicals (the polymeric chains with a free radical site) to ultimately bond at their respective high energy electron sites and thereby create the new molecules of the embodiments.

The radiation is absorbed by an element (a first element) on the elastomer, and that (first) element is boosted to an energy level whereby it detaches from the general elastomer molecule. As noted before, this leaves another (second) element in the polymer chain (where the second element was previously attached to the first element) with a free radical site. The amount of energy absorbed (the dose) is measured in units of kiloGrays (kGy), where 1 kGy is equal to 1,000 Joules per kilogram, or in units of MegaRads (MR, MeRAD, or Mrad), where 1 MR is equal to 100,000,000 ergs per gram.

Electron beam processing is usually effected with an electron accelerator. Individual accelerators are usefully characterized by their energy, power, and type. Low-energy accelerators provide beam energies from about 150 keV to about 2.0 MeV. Medium-energy accelerators provide beam energies from about 2.5 to about 8.0 MeV. High-energy accelerators provide beam energies greater than about 9.0 MeV. Accelerator power is a product of electron energy and beam current. Such powers range from about 5 to about 300 kW. The main types of accelerators are: electrostatic direct-current (DC), electrodynamic DC, radiofrequency (RF) linear accelerators (LINACS), magnetic-induction LINACs, and continuous-wave (CW) machines.

In one embodiment, the particular combination of an elastomer (alternatively, a vulcanizate) with any of a metallic element, a ceramic, and a polymeric carbon chain thermoplastic by use of radiation-facilitated bonding appears to create a new compound when the elastomer molecule is treated with radiation such as an electron beam. This compound corresponds to the Formula I:

$$AD$$

where A is a polymeric carbon chain elastomeric moiety containing elastomeric functionality and having a collective atomic weight of from about 350 to about 10,000,000, and D is any of a metallic element, a ceramic moiety, and a polymeric carbon chain thermoplastic moiety. In the case of D being a polymeric carbon chain thermoplastic moiety, D is a free radical polymeric derivative of a thermoplastic molecule having a molecular weight of from about 120 to about 10,000,000. In the case of D being a ceramic moiety, D is a free radical ceramic compound derivative of a ceramic compound. In either of the cases, where D is a polymeric carbon chain thermoplastic moiety or a ceramic moiety, electron-beam treatment of the precursor respective thermoplastic molecule or ceramic compound is the preferred manner for making the respective free radical derivatives.

The A moiety is derived from a free radical polymeric derivative of an elastomer molecule. In alternative embodiments, this elastomer molecule is any of a fluoroelastomer molecule, an acrylic acid ester rubber/polyacrylate rubber molecule, an ethylene acrylic rubber molecule, a silicone molecule, a nitrile butyl rubber molecule, a hydrogenated nitrile rubber molecule, or a polyurethane molecule.

In the case of D being a polymeric carbon chain thermoplastic moiety, D is derived from a free radical polymeric derivative of an thermoplastic molecule. In alternative embodiments, this thermoplastic molecule is any of a polyamide molecule, a nylon 6 molecule, a nylon 66 molecule, a nylon 64 molecule, a nylon 63 molecule, a nylon 610 molecule, a nylon 612 molecule, an amorphous nylon molecule, a polyester molecule, a polyethylene terephthalate molecule, a polystyrene molecule, a polymethyl methacrylate molecule, a thermoplastic polyurethane molecule, a polybutylene molecule, a polyesteretherketone molecule, a polyimide molecule, a fluoroplastic molecule, a polyvinylidene fluoride molecule, a polysulfone molecule, a polycarbonate molecule, a polyphenylene sulfide molecule, a polyethylene molecule, a polypropylene molecule, a polyacetal molecule, a perfluoroalkoxy (tetrafluoroethylene/perfluoromethylvinyl ether) molecule, a tetrafluoroethylene/perfluoromethylvinyl ether molecule, an ethylene tetrafluoroethylene molecule, an ethylene chlorotrifluoroethylene molecule, a tetrafluoroethylene/hexafluoropropylene/vinylidene fluoride molecule, a tetrafluoroethylene/hexafluoropropylene molecule, a polyester thermoplastic ester molecule, a polyester ether copolymer molecule, a polyamide ether copolymer molecule, and a polyamide thermoplastic ester molecule.

Turning now to FIG. 1, a ternary composition diagram 100 is presented showing tetrafluoroethylene (TFE), hexfluoropropylene (HFP), and vinylidene fluoride weight percentage combinations for making various co-polymer blends. Region 101 defines blends of respective tetrafluoroethyl, hexfluoropropyl, and vinylidyl fluoride overall block amounts that combine to form fluoroelastomer (FKM) polymers. Region 104 defines blends of respective tetrafluoroethyl, hexfluoropropyl, and vinylidyl fluoride overall block amounts that combine to form perfluoroalkoxy tetrafluoroethylene/perfluoromethylvinyl ether and tetrafluoroethylene/hexafluoropropylene polymers. Region 106 defines blends of respective tetrafluoroethyl, hexfluoropropyl, and vinylidyl fluoride overall block amounts that combine to form tetrafluoroethylene/hexafluoropropylene/vinylidene fluoride polymers. Region 108 defines blends of respective tetrafluoroethyl, hexfluoropropyl, and vinylidyl fluoride overall block amounts that combine to form ethylene tetrafluoroethylene polymers. Region 110 defines blends of respective tetrafluoroethyl, hexfluoropropyl, and vinylidyl fluoride overall block amounts that traditionally have not generated useful co-polymers. Region 102 defines blends of respective tetrafluoroethyl, hexfluoropropyl, and vinylidyl fluoride overall block amounts that combine to form polytetrafluoroethylene (PTFE) polymers. Region 114 defines blends of respective tetrafluoroethyl, hexfluoropropyl, and vinylidyl fluoride overall block amounts that combine to form polyvinylidene fluoride (PVdF) polymers. Region 116 defines blends of respective tetrafluoroethyl, hexfluoropropyl, and vinylidyl fluoride overall block amounts that combine to form polyhexfluoropropylene (PHFP) polymers.

Returning to a consideration of the compound of Formula I, the embodiment of Formula I provides, in one perspective, a molecular chimera (bi-modal molecule) where one portion is elastomeric in its fundamental nature and a second portion is a non-elastomeric in its fundamental nature. A molecule of this structure therefore provides a chemical structure having one portion that is structurally conformant with an elastomer and a second portion that is structurally conformant with a non-elastomer. Accordingly, the general bonding between an elastomeric region and a non-elastomeric region is potentially very high when such molecules exist as inter-bonding molecules at the interface between the two regions. Such bonding between regions with inter-bonding molecules (such as the compound of Formula I) is superior to region to region bonding derived from electronic or electrostatic attraction (for example, Van der Waal's forces) between molecules of the two regions, even when those forces derive from free radicals or reduced elements that were prepared by use of radiation.

In preferred embodiments of the compound of Formula I, D is halogenated plastic and A is from a molecule corresponding to the Formula II:

where TFE is essentially a tetrafluoroethyl block, HFP is essentially a hexfluoropropyl block, and VdF is essentially a vinylidyl fluoride block, and products qd and rd and sd collectively provide proportions of TFE, HFP, and VdF whose values are within Region 101 (drawing element 101) of FIG. 1.

Figure 2:
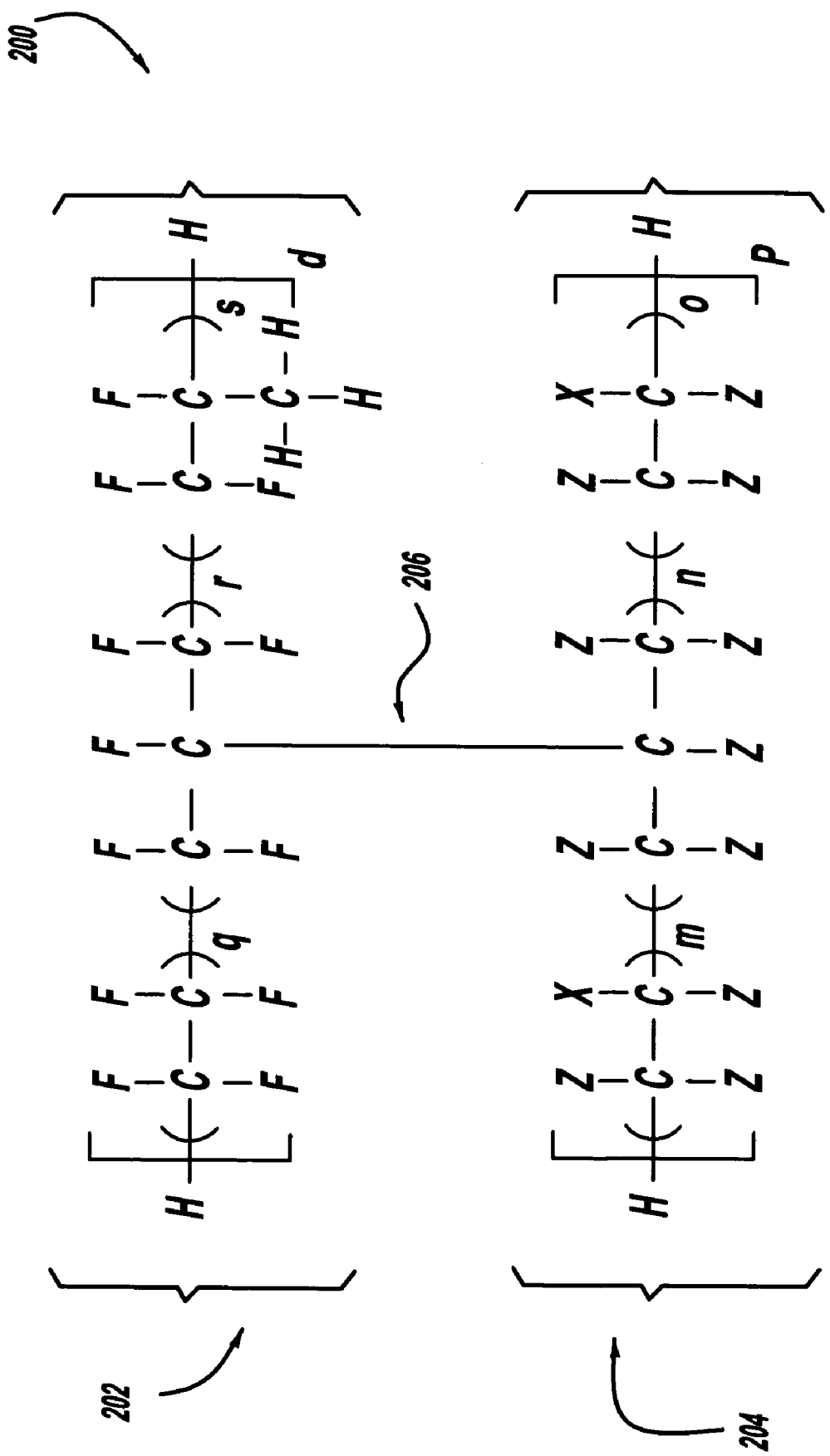
FIG. 2 shows a molecular schematic of a bi-modal molecule derived from an elastomer and a thermoplastic.

One embodiment of the molecule (compound) according to Formula I is partially depicted by molecular schematic 200 in FIG. 2, where moiety A (moiety 202—where products qd and rd and sd collectively provide proportions of TFE, HFP, and VdF whose values are within Region 101 of FIG. 1 and where qd, rd, and sd taken together provide a collective atomic weight of about 750,000 for moiety 202), is attached with covalent bond to moiety D (moiety 204-—where products mp and np and op together provide a collective atomic weight of about 750,000 for moiety 204). Moiety 202 is derived from a fluoroelastomer. Moiety 204 is derived from a halogenated thermoplastic. Accordingly, Z is (independently within any of the sub-blocks replicated in any of the respective m instances, n instances, and o instances) any of F, Cl, I, Br, H, or a functional group; and X is (independently within any of the sub-blocks replicated in any of the respective m instances, n instances, and o instances) any of F, Cl, I, or Br. In this regard, halogenated polymers demonstrate especially good free radical generation through removal of a halogen from their carbon chains when subjected to electron beam radiation (preferably with electron beam radiation of from about 0.1 MeRAD to about 40 MeRAD and, more preferably, with electron beam radiation of from about 5 MeRAD to about 20 MeRAD). Bond 206 is established from the locations where the original elastomer molecule and the original halogenated thermoplastic molecule "lost" halogens to provide subsequent free radical sites prior to the establishment of bond 206.

As previously noted, the general bonding between an elastomeric region and a non-elastomeric region is potentially very high when molecules according to Formula I exist as inter-bonding molecules at the interface between the two regions. Several alternative embodiments of materials, compositions, and articles having such diverse regions benefit from these inter-bonding molecules.

Figure 3:
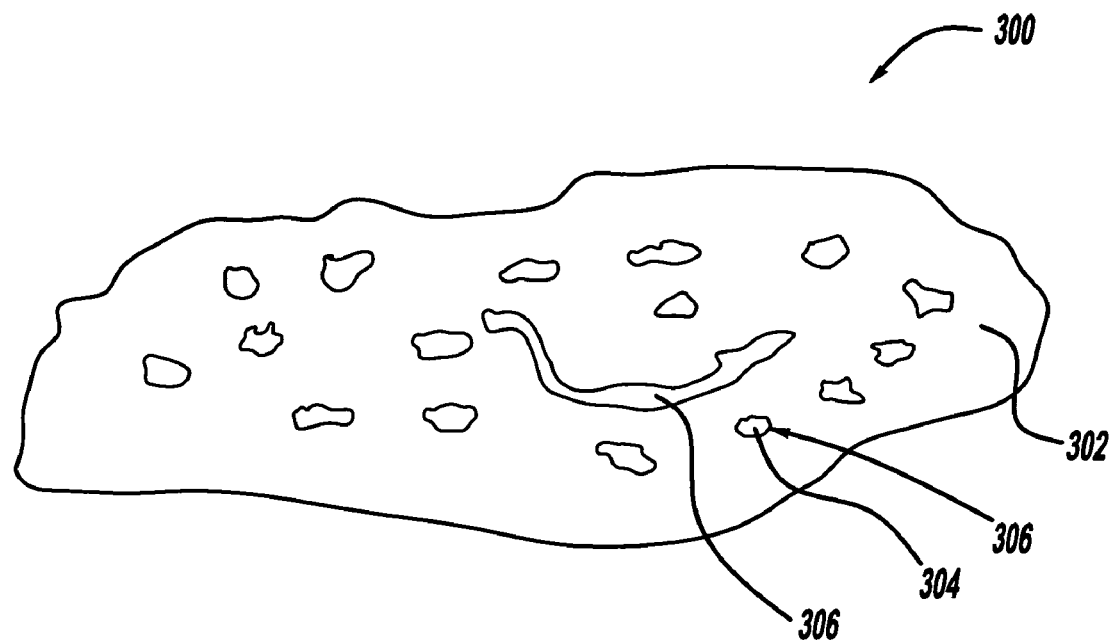
FIG. 3 overviews a portion of an admixture of elastomer and thermoplastic.

One embodiment of a diverse region material having a continuous phase and a dispersed phase is admixture 300 as shown in FIG. 3. Admixture 300 is a polymeric blend (admixture) of an elastomer (alternatively, vulcanizate) phase and a plastic phase, where the plastic phase is initially admixed as a thermoplastic. After admixing, admixture 300, is, irradiated (preferably with electron beam radiation) to cross-link the thermoplastic and further vulcanize or otherwise modify the elastomer (or vulcanizate).

An admixture, such as admixture 300, established by admixing phases of polymer usually differentiates the continuous phase and dispersed phase on the basis of relative viscosity between two initial polymeric fluids (where the first polymeric fluid has a first viscosity and the second polymeric fluid has a second viscosity). The phases are differentiated during admixing of the admixture from the two initial polymeric fluids. In this regard, the phase having the lower viscosity of the two phases will generally encapsulate the phase having the higher viscosity. The lower viscosity phase will therefore usually become the continuous phase in the admixture, and the higher viscosity phase will become the dispersed phase. When the viscosities are essentially equal, the two phases will form an interpenetrated structure of polymer chains. Accordingly, in general dependence upon the relative viscosities of the admixed elastomer and thermoplastic, several embodiments of admixed compositions derive from the general admixing approach and irradiation.

In a first admixture embodiment, admixture 300 has a continuous phase of cross-linked plastic 302 cross-linked from prior thermoplastic polymer. Admixture 300 also has a dispersed phase of vulcanized elastomer in a plurality of vulcanized elastomeric portions (such as portion 304) dispersed in continuous phase 302. Admixture 300 in this embodiment is therefore derived from intermixing relatively high viscosity elastomer (or partially vulcanized elastomer) with relatively low viscosity thermoplastic and then irradiating (preferably with electron beam radiation) the admixture. In one embodiment of admixture 300, vulcanized elastomer portions are vulcanized to provide a compression set value from about 50 to about 100 percent of the difference between a non-vulcanized compression set value respective to the base elastomer and a fully-vulcanized compression set value respective to the base elastomer.

In this regard, it is to be noted that percentage in the 50 to about 100 percent range respective to the difference (between a non-vulcanized compression set value respective to the base elastomer and a fully-vulcanized compression set value respective to the base elastomer) applies to the degree of vulcanization in the elastomer rather than to percentage recovery in a determination of a particular compression set value. As an example, an elastomer prior to vulcanization has a non-vulcanized compression set value of 72 (which could involve a 1000% recovery from a thickness measurement under compression to a thickness measurement after compression is released). After extended vulcanization, the vulcanized elastomer demonstrates a fully-vulcanized compression set value of 10. The difference between the values of 72 and 10 indicate a range of 62 between the non-vulcanized compression set value respective to the base elastomer and a fully-vulcanized compression set value respective to the base elastomer. Since the compression set value decreased with vulcanization in the example, a compressive set value within the range of 50 to about 100 percent of the difference between a non-vulcanized compression set value respective to the base elastomer and a fully-vulcanized compression set value respective to the base elastomer would therefore be achieved with a compressive set value between about 41 (50% between 72 and 10) and about 10 (the fully-vulcanized compression set value).

Continuous phase 302 and the dispersed phase (such as portion 304) are inter-bonded by (at least one) inter-bonding molecule(s) corresponding to an elastomer-thermoplastic polymer according to Formula I; these inter-bonding molecules strengthen regional interfaces such as interface 306. The A moiety of the Formula I compound is derived from a molecule of the initial elastomer phase (as admixed prior to irradiation treatment), and the D moiety is derived from a molecule of the initial thermoplastic phase (as admixed prior to irradiation treatment).

In preferred embodiments of admixture 300, vulcanized elastomer is derived from any of the elastomers of fluoroelastomer, acrylic acid ester rubber/polyacrylate rubber, ethylene acrylic rubber, silicone, nitrile butyl rubber, hydrogenated nitrile rubber, polyurethane, and combinations thereof. The cross-linked thermoplastic polymer is cross-linked from any of the thermoplastics of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyesteretherketone, polyimide, fluoroplastic, polyvinylidene fluoride, polysulfone, polycarbonate, polyphenylene sulfide, polyethylene, polypropylene, polyacetal polymer, polyacetal, perfluoroalkoxy (tetrafluoroethylene/perfluoromethylvinyl ether), tetrafluoroethylene/perfluoromethylvinyl ether, ethylene tetrafluoroethylene, ethylene chlorotrifluoroethylene, tetrafluoroethylene/hexafluoropropylene/vinylidene fluoride, tetrafluoroethylene/hexafluoropropylene, polyester thermoplastic ester, polyester ether copolymer, polyamide ether copolymer, polyamide thermoplastic ester, and combinations thereof.

Preferably, each of the vulcanized elastomeric portions (such as portion 304) has a cross-sectional diameter from about 0.1 microns to about 100 microns. In this regard, it is to be further appreciated that any portion (such as portion 304) is essentially spherical in shape In one embodiment, or, in an alternative embodiment, is filamentary (such as in portion 308) in shape with the filament having a cross-sectional diameter from about 0.1 microns to about 100 microns.

The dispersed phase portions (such as portion 304) collectively are from about 20 weight percent to about 90 weight percent of the admixture 300 composition.

In a second admixture embodiment, admixture 300 has a continuous phase of vulcanized elastomer 302 cross-linked from initially admixed elastomer (or initially admixed lightly vulcanized elastomer) and is derived from intermixing relatively high viscosity thermoplastic with relatively low viscosity elastomer (or partially vulcanized elastomer) and then irradiating (preferably with electron beam radiation) the admixture. Admixture 300 also has a dispersed phase of cross-linked plastic in a plurality of cross-linked plastic portions (such as portion 304) dispersed in continuous phase 302. In one embodiment of admixture 300, vulcanized elastomer 302 is vulcanized to provide a compression set value from about 50 to about 100 percent of the difference between a non-vulcanized compression set value for the base elastomer and a fully-vulcanized compression set value for the base elastomer. The plurality of cross-linked plastic portions (such as portion 304) as dispersed in continuous phase 302 are cross-linked plastic as cross-linked from thermoplastic polymer.

The continuous phase 302 and dispersed phase (such as portion 304) of this second admixture embodiment are inter-bonded by (at least one) inter-bonding molecule(s) corresponding to an elastomer-thermoplastic polymer according to Formula I; these inter-bonding molecules strengthen regional interfaces such as interface 306. The A moiety of the Formula I compound is derived from a molecule of the initial elastomer phase (as admixed prior to irradiation treatment), and the D moiety is derived from a molecule of the initial thermoplastic phase (as admixed prior to irradiation treatment).

In preferred embodiments of this second embodiment of admixture 300, vulcanized elastomer is derived from any of the elastomers of fluoroelastomer, acrylic acid ester rubber/polyacrylate rubber, ethylene acrylic rubber, silicone, nitrile butyl rubber, hydrogenated nitrile rubber, polyurethane, and combinations thereof. The cross-linked thermoplastic polymer is cross-linked from any of the thermoplastics of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyesteretherketone, polyimide, fluoroplastic, polyvinylidene fluoride, polysulfone, polycarbonate, polyphenylene sulfide, polyethylene, polypropylene, polyacetal polymer, polyacetal, perfluoroalkoxy (tetrafluoroethylene/perfluoromethylvinyl ether), tetrafluoroethylene/perfluoro-methylvinyl ether, ethylene tetrafluoroethylene, ethylene chlorotrifluoroethylene, tetrafluoroethylene/hexafluoropropylene/vinylidene fluoride, tetrafluoro-ethylene/hexafluoropropylene, polyester thermoplastic ester, polyester ether copolymer, polyamide ether copolymer, polyamide thermoplastic ester, and combinations thereof.

Preferably, each of the cross-linked plastic portions (such as portion 304) has a cross-sectional diameter from about 0.1 microns to about 100 microns. In this regard, it is to be further appreciated that any portion (such as portion 304) is essentially spherical in shape In one embodiment, or, in an alternative embodiment, is filamentary (such as in portion 308) in shape with the filament having a cross-sectional diameter from about 0.1 microns to about 100 microns.

The continuous phase (portion 302) of this second embodiment collectively is from about 20 weight percent to about 90 weight percent of the admixture 300 composition.

In a third admixture embodiment, an interpenetrated structure admixture of molecules of an elastomer, molecules of a thermoplastic, and a molecule (alternatively, molecules) corresponding to an elastomer-thermoplastic polymer according to Formula I is (are) derived from intermixing elastomer and thermoplastic materials of essentially comparable viscosity and then irradiating (preferably with electron beam radiation) the admixture. Such an interpenetrated structure may also be termed as a "polymeric alloy" or "polymeric alloy blend" respective to existence of highly interspersed and/or interwoven microphases such as exist in crystalline and non-crystalline phases in metallic alloys.

In preferred embodiments of this third admixture embodiment, elastomer is derived from any of the elastomers of fluoroelastomer, acrylic acid ester rubber/polyacrylate rubber, ethylene acrylic rubber, silicone, nitrile butyl rubber, hydrogenated nitrile rubber, polyurethane, and combinations thereof. The cross-linked thermoplastic polymer is cross-linked from any of the thermoplastics of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyesteretherketone, polyimide, fluoroplastic, polyvinylidene fluoride, polysulfone, polycarbonate, polyphenylene sulfide, polyethylene, polypropylene, polyacetal polymer, polyacetal, perfluoroalkoxy (tetrafluoroethylene/perfluoro-methylvinyl ether), tetrafluoroethylene/perfluoromethylvinyl ether, ethylene tetrafluoroethylene, ethylene chlorotrifluoroethylene, tetrafluoroethylene/hexafluoropropylene/vinylidene fluoride, tetrafluoroethylene/hexafluoropropylene, polyester thermoplastic ester, polyester ether copolymer, polyamide ether copolymer, polyamide thermoplastic ester, and combinations thereof.

Prior to irradiation, the elastomer of this third embodiment is from about 20 weight percent to about 90 weight percent of the polymeric admixture. In this interpenetrated structure embodiment, with some dependence upon the portion of elastomer in the admixture, the yield of molecules corresponding to Formula I is, in some embodiments, higher than in the first and second admixture embodiments.

Figure 4:
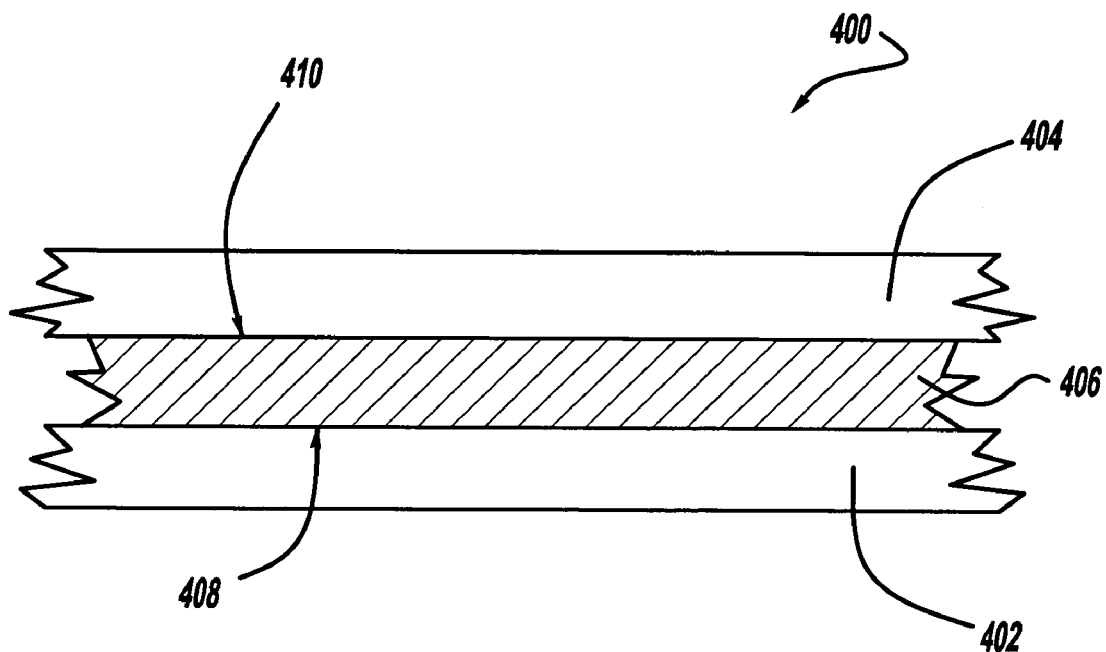
FIG. 4 presents a general three-layer composite structure.

A composite as generally presented in composite 400 of FIG. 4 provides another embodiment of a material, composition, and/or article having diverse regions benefiting from inter-bonding molecules between any two regions where each inter-bonding molecule has a moiety derived from two diverse molecules of any two respective diverse inter-bonded regions after treatment by irradiation (such as an electron beam).

Composite 400 has a layer 402 of a structural material. Layer 402 is made of metal, polymer, or ceramic. Composite 400 also has a layer 404 of a structural material. Layer 404 is also independently made of metal, polymer, or ceramic. It should be noted that the term "structural material" denotes the contribution of the layer to the overall performance of the composite as viewed from the intended application of the composite where the nature of the outside layers of a composite determine its utility in the application (under the presumption that the adhesion between the layers should be acceptable for the application and that details of the adhesive system in the composite are not otherwise of performance interest in the application of the composite). In this regard, a structural layer provides any desired performance property to the composite as a structure in its intended application. This desired performance property provides to the composite any of, without limitation, rigid or flexible support (a structural support layer), chemical or solvent resistance, thermal resistance, flame resistance, adsorption capability, absorption capability, robustness under compression, robustness under tension, any combination of these, and/or the like.

Adhesive layer 406 is positioned between layer 402 and layer 404. Adhesive layer 406 is made of polymer. Adhesive layer 406 is, In one embodiment, bonded to either of layers 402 or 404 by use of irradiation (preferably by electron beam radiation). In this regard, after irradiation, adhesive layer 406 is inter-bonded at interface 408 or at interface 410 to the structural material of either layer 402 or layer 404, respectively, with at least one inter-bonding molecule corresponding to the Formula III:

$$AD$$

where A is a polymeric carbon chain moiety derived from the polymer of the adhesive layer, D is a metallic element derived from the metal of the inter-bonded structural material layer when the inter-bonded structural material layer is made of metal, D is a ceramic moiety from a free radical ceramic derivative of the ceramic of the inter-bonded structural material layer when the inter-bonded structural material layer is made of ceramic, or D is from a free radical polymeric derivative of the polymer of the inter-bonded structural material layer when the inter-bonded structural material layer is made of polymer.

Adhesive layer 406 is, in a second embodiment, bonded to each of layers 402 or 404 by use of irradiation (preferably by electron beam radiation). In this regard, after irradiation, adhesive layer 406 is inter-bonded to the structural material of layer 402 and also to the structural material of layer 404. Adhesive layer 406 is bonded to layer 402 with at least one inter-bonding molecule at interface 408 corresponding to Formula IV:

$$AD$$

where A is a polymeric carbon chain moiety derived from the polymer of adhesive layer 406, D is a metallic element derived from the metal of layer 402 when layer 402 is made of metal, D is a ceramic moiety from a free radical ceramic derivative of the ceramic of layer 402 when layer 402 is made of ceramic, and D is from a free radical polymeric derivative of the polymer of layer 402 when layer 402 is made of polymer.

Adhesive layer 406 is also bonded to layer 404 with at least one inter-bonding molecule at interface 410 corresponding to Formula V:

$$AE$$

where A is a polymeric carbon chain moiety derived from the polymer of adhesive layer 406, E is a metallic element derived from the metal of layer 404 when layer 404 is metal, E is a ceramic moiety from a free radical ceramic derivative of the ceramic of layer 404 when layer 404 is ceramic, and E is a polymeric carbon chain moiety from a free radical polymeric derivative of the polymer of layer 404 when layer 404 is polymer.

The use of radiation (preferably electron beam radiation) in inter-bonding the above alternative composite embodiments enables each composite to be assembled by
(a) providing a first layer of structural material (either metal, polymer, or ceramic);
(b) positioning a solid adhesive layer (polymer) onto the first layer;
(c) positioning a second layer of structural material (either metal, polymer, or ceramic) onto the adhesive layer; and
(d) irradiating the first layer, the second layer, and the adhesive layer with electron beam radiation sufficient to inter-bond the first layer to the adhesive layer and to inter-bond the second layer to the adhesive layer.

There are various benefits in this approach to composite manufacture. By using a solid adhesive, a benefit is enabled in composite manufacture that is, in some respects, appreciated from a consideration of manufacturing tradeoffs between making a peanut butter sandwich as compared to making a grilled cheese sandwich from a slice of essentially solid cheese or a non-flowing slice of flexible cheese (with irradiation being metaphorically represented by the heat that eventually melts the cheese to provide the bonding between the cheese slice and bread slices). In considering peanut butter and cheese as the alternative adhesives, the peanut butter usually requires resolution of more complex handling issues than does the slice of cheese. Peanut butter is highly viscous and requires time, effort, and alignment to be spread (flowably deposited) onto at least one of the bread slices. Positioning of the second bread slice needs a certain degree of careful alignment. In this regard, repositioning of the second bread slice (in the event of an alignment error when the second bread slice was first incorrectly positioned and pressed against the peanut butter deposited on the first bread slice) after having been "glued" to the peanut butter first requires separating of the second bread slide from the peanut butter; such separating usually tears the bread slice. So, it is important to position the second bread slice accurately the first time it is positioned against the peanut butter (zero entropy positioning is needed). A cheese sandwich, in contrast, is rather easy to assemble prior to heating. The slice of cheese is essentially solid or flexibly solid in a non-flowable sense, and it doesn't initially adhere to either of the bread slices. The cheese is positioned as a unit onto one slice of bread (rather than being flowably deposited or spread onto the bread slice), and the second slice of bread is conveniently positioned onto the cheese slice. Prior to heating, the cheese can be repositioned without much effort (positioning entropy can be essentially very high up to the time when the cheese is heated) and without destructive impact on either of the bread slices. In a similar way, construction of a composite is expedited if the adhesive of the composite is positioned as a solid between the structural layers of the composite. Such an approach works well in the preferred embodiments if the solid adhesive is then inter-bonded with irradiation (preferably electron beam radiation) to its two structural layers.

The use of irradiation to inter-bond the adhesive to one or both of the layers also has a benefit in that the polymer of the adhesive layer is readily capable of having a desired performance property (such as, for example and without limitation, tensile strength, elongation, modulus, and/or chemical resistance) in the composite that is superior to the same performance property in either of the layers attached to the adhesive layer. In conjunction with, for example, inter-bonding between adhesive 406 and layer 402 and with inter-bonding between adhesive 406 and layer 404, the failure point of composite 400 respective to any particular so desired performance property will not be in the adhesive or even in the inter-bonded interfaces of composite 400. This is not the case in many composites assembled with adhesives that bond either with functional group linkages, Van der Waals forces, and/or hydrogen bonds. In this regard, the adhesive layer or the interface between the adhesive layer and a structural layer is frequently the weak link in the integrity of traditional composite structures.

The use of irradiation to inter-bond the adhesive to one or both of the layers also has a benefit in the broad spectrum of materials that are candidates for the adhesive layer of the composite. In alternative embodiments, adhesive layer 406 is any of fluoroelastomer, thermoplastic, thermoplastic elastomer, thermoplastic vulcanizate, thermoset plastic, polytetrafluoroethylene, and combinations thereof.

In yet further alternative embodiments, adhesive layer 406 is any of acrylic acid ester rubber/polyacrylate rubber thermoplastic vulcanizate acrylonitrile-butadiene-styrene, amorphous nylon, cellulosic plastic, ethylene chlorotrifluoro-ethylene, epoxy resin, ethylene tetrafluoroethylene, ethylene acrylic rubber, ethylene acrylic rubber thermoplastic vulcanizate, ethylene-propylene-diamine monomer rubber/polypropylene thermoplastic vulcanizate, tetrafluoroethylene/hexafluoropropylene, fluoroelastomer, fluoroelastomer thermoplastic vulcanizate, fluoroplastic, hydrogenated nitrile rubber, melamine-formaldehyde resin, tetrafluoroethylene/perfluoromethylvinyl ether, natural rubber, nitrile butyl rubber, nylon, nylon 6, nylon 610, nylon 612, nylon 63, nylon 64, nylon 66, perfluoroalkoxy (tetrafluoroethylene/perfluoromethylvinyl ether), phenolic resin, polyacetal, polyacrylate, polyamide, polyamide thermoplastic, thermoplastic elastomer, polyamide-imide, polybutene, polybutylene, polycarbonate, polyester, polyester thermoplastic, thermoplastic elastomer, polyesteretherketone, polyethylene, polyethylene terephthalate, polyimide, polymethylmethacrylate, polyolefin, polyphenylene sulfide, polypropylene, polystyrene, polysulfone, polytetrafluoroethylene, polyurethane, polyurethane elastomer, polyvinyl chloride, polyvinylidene fluoride, ethylene propylene dimethyl/polypropylene thermoplastic vulcanizate, silicone, silicone-thermoplastic vulcanizate, thermoplastic polyurethane, thermoplastic polyurethane elastomer, thermoplastic polyurethane vulcanizate, thermoplastic silicone vulcanizate, thermoplastic urethane, thermoplastic urethane elastomer, tetrafluoroethylene/hexafluoropropylene/vinylidene fluoride, polyamide-imide, and combinations thereof. In yet further alternative embodiments, the adhesive layer has a curing agent is admixed into the polymer of the adhesive layer.

In one composite embodiment, the polymer of any of first layer 402 and second layer 404 is halogenated plastic and adhesive layer 406 corresponds to Formula II.

At least one layer is, in one embodiment, surface-activated prior to attachment to another layer. In this regard, the surface of essentially any halogenated polymer plastic appears to be "etchable" with an electron beam to yield free radical sites on the surface. In a surprising find, these free radical sites then appear to demonstrate remarkable stability for a period of time. In this regard, as previously noted, free-radicals usually react very rapidly with other materials; but free radical polymer chains appear to be much more stable in the free radical state, especially if the polymeric free radical is constrained from movement and also constrained from contact with other materials that would bond to the free radical site of the polymer chain. Respective to the surprising find, it is believed that electron beam bombardment of a surface of a halogenated plastic at an energy level of from about 0.1 MeRAD to about 40 MeRAD (preferably from about 5 MeRAD to about 20 MeRAD) provides sufficient energy for dislodging a plurality of halogen atoms from the halogenated polymer of the surface and for generating thereby a set of initial residual free radical sites in polymeric chains of the surface upon conclusion of the etching without extensive fracturing of the polymer chains, and that maintenance of the surface in an inert environment and at a temperature sufficient to minimize mobility of the polymer chains of the plastic so that they are kept from mutual interaction sustains at least 99 percent of the free radical sites of the set of initial residual free radical sites for at least 4 hours. Furthermore, it is believed that maintenance of the surface in an inert environment and at a temperature sufficient to minimize mobility of the polymer chains of the plastic so that they are kept from mutual interaction sustains at least 90 percent of the free radical sites of the set of initial residual free radical sites for at least 8 hours.

Preferably, the temperature at which the etched material will provide the sustained retention of its free radical sites is room temperature or a temperature lower than room temperature. In one embodiment, the inert environment is a noble gas. In another embodiment, the inert environment is high purity nitrogen. In yet another embodiment, the pressure of the inert environment is less than 0.1 atmospheres. In yet another embodiment, a vacuum is applied to the etched material surface. In yet another embodiment, a static free environment is enabled at the etched material surface.

Turning now to method embodiments for making the material, composition, and/or article embodiments discussed in the foregoing, one method embodiment for making a compound is to (a) generate at least one free radical site on an elastomer molecule to yield a free radical polymeric carbon chain elastomeric molecule; and (b) bond the free radical polymeric carbon chain elastomeric molecule with any of, in the alternative, a metallic element, a ceramic moiety, and a polymeric carbon chain thermoplastic moiety;

where the elastomeric molecule has a collective atomic weight of from about 350 to about 10,000,000, the thermoplastic moiety is from a free radical polymeric derivative of a thermoplastic molecule having a molecular weight of from about 120 to about 10,000,000 when the thermoplastic moiety is bonded to the free radical polymeric carbon chain elastomeric molecule, and the ceramic moiety is from a free radical ceramic compound derivative of a ceramic compound when the ceramic moiety is bonded to the free radical polymeric carbon chain elastomeric molecule.

In one embodiment, the elastomer molecule is any of a fluoroelastomer molecule, an acrylic acid ester rubber/polyacrylate rubber molecule, an ethylene acrylic rubber molecule, a silicone molecule, a nitrile butyl rubber molecule, a hydrogenated nitrile rubber molecule, natural rubber molecule, a ethylene-propylene-diamine monomer rubber/polypropylene thermoplastic vulcanizate molecule, and a polyurethane molecule.

In an alternative embodiment, the thermoplastic molecule is any of a polyamide molecule, a nylon 6 molecule, a nylon 66 molecule, a nylon 64 molecule, a nylon 63 molecule, a nylon 610 molecule, a nylon 612 molecule, an amorphous nylon molecule, a polyester molecule, a polyethylene terephthalate molecule, a polystyrene molecule, a polymethyl methacrylate molecule, a thermoplastic polyurethane molecule, a polybutylene molecule, a polyesteretherketone molecule, a polyimide molecule, a fluoroplastic molecule, a polyvinylidene fluoride molecule, a polysulfone molecule, a polycarbonate molecule, a polyphenylene sulfide molecule, a polyethylene molecule, a polypropylene molecule, a polyacetal molecule, a perfluoroalkoxy (tetrafluoroethylene/perfluoromethylvinyl ether) molecule, a tetrafluoroethylene/perfluoromethylvinyl ether molecule, an ethylene tetrafluoroethylene molecule, an ethylene chlorotrifluoroethylene molecule, a tetrafluoroethylene/hexafluoropropylene/vinylidene fluoride molecule, a tetrafluoroethylene/hexafluoropropylene molecule, a polyester thermoplastic ester molecule, a polyester ether copolymer molecule, a polyamide ether copolymer molecule, and a polyamide thermoplastic ester molecule.

In one embodiment, the elastomer is a compound according to Formula II.

In a preferred embodiment, the generation of the free radical site on the elastomer is achieved by irradiating the elastomer molecule with electron beam radiation (preferably of from about 0.1 MeRAD to about 40 MeRAD and, more preferably, from about 5 MeRAD to about 20 MeRAD).

In one embodiment, the free radical generation and the bonding occur within a cavity of a mold, where the housing of the mold enables transmission of an electron beam from an outside surface of the housing through the housing surface defining (at least in part) the cavity and thereby to the elastomer molecule. The penetration depth of a particular electron beam depends upon the strength of the electron beam, the density of the housing materials, and the particular material used in the housing. In this regard, the entire mold housing is, in one embodiment, made of a material (such as glass, steel, plastic, brass, or aluminum) that will transmit the radiation (preferably an electron beam). In an alternative embodiment, a portion of the mold housing is made of a material that will transmit the radiation. In yet another embodiment, a beam port (glass, steel, plastic, brass, or aluminum) is embedded into the mold housing and the beam port is made of a material that will transmit the radiation. In another approach, the free radical generation and the bonding occur after a shaped article has been formed of the material having the elastomer and then cooled within a cavity of a mold; the mold is opened and the cooled material then irradiated with an electron beam (prior to removal of the shaped article from the mold) in one embodiment of this approach, or the cooled material is removed from the mold prior to being irradiated in another embodiment of this approach.

Indeed, in one embodiment, monomers, oligomers, or low molecular weight polymeric precursors of a higher molecular weight polymer are injected in liquid form into a mold, and further curing and polymerization of these materials into the final article is performed by the use of electron beam irradiation.

In another method embodiment, a composition is made by
(a) admixing a dispersed phase of a plurality of vulcanized elastomeric portions into a continuous phase of thermoplastic polymer where the dispersed phase of vulcanized elastomer has been previously vulcanized to provide a compression set value from about 50 to about 100 percent of the difference between a non-vulcanized compression set value for the elastomer and a fully-vulcanized compression set value for the elastomer; and
(b) cross-linking the continuous phase.

Preferably, the cross-linking operation inter-bonds the continuous phase and the dispersed phase with at least one inter-bonding molecule corresponding to an elastomer-thermoplastic polymer according to Formula I. In this regard, A is an elastomeric moiety from a free radical polymeric derivative derived from the elastomer of the dispersed phase where the elastomeric moiety has a collective atomic weight of from about 350 to about 10,000,000; and D is a polymeric carbon chain thermoplastic moiety from a free radical polymeric derivative of a thermoplastic molecule from the continuous phase where the thermoplastic molecule has a molecular weight of from about 120 to about 10,000,000.

In one embodiment of this method, the vulcanized elastomer is derived from an elastomer of any of fluoroelastomer, acrylic acid ester rubber/polyacrylate rubber, ethylene acrylic rubber, silicone, nitrile butyl rubber, hydrogenated nitrile rubber, natural rubber, ethylene-propylene-diamine monomer rubber/polypropylene thermoplastic vulcanizate, polyurethane, and combinations thereof.

In one embodiment of this method, the thermoplastic polymer is any of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyester-etherketone, polyimide, fluoroplastic, polyvinylidene fluoride, polysulfone, polycarbonate, polyphenylene sulfide, polyethylene, polypropylene, polyacetal polymer, polyacetal, perfluoroalkoxy (tetrafluoroethylene/perfluoromethylvinyl ether), tetrafluoroethylene/perfluoromethylvinyl ether, ethylene tetrafluoroethylene, ethylene chlorotrifluoroethylene, tetrafluoroethylene/hexafluoro-propylene/vinylidene fluoride, tetrafluoroethylene/hexafluoropropylene, polyester thermoplastic ester, polyester ether copolymer, polyamide ether copolymer, polyamide thermoplastic ester, and combinations thereof.

In one embodiment, the cross-linking is achieved by irradiating the dispersed and continuous phases with electron beam radiation (preferably of from about 0.1 MeRAD to about 40 MeRAD and, more preferably, from about 5 MeRAD to about 20 MeRAD).

In one embodiment, the cross-linking is achieved by irradiating the dispersed and continuous phases within a cavity of the previously described mold, where the housing of the mold enables transmission of an electron beam from an outside surface of the housing through a surface of the cavity and thereby to the dispersed and continuous phases.

In one embodiment, each of the elastomeric portions are admixed to provide a cross-sectional diameter (in either essentially spherical or filament formed portions) from about 0.1 microns to about 100 microns.

In one embodiment, the dispersed phase provides from about 20 weight percent to about 90 weight percent of the admixture.

In another method embodiment, a composition is made by
(a) admixing a dispersed phase of a plurality of elastomeric portions into a continuous phase of thermoplastic polymer; and
(b) cross-linking the continuous and dispersed phases.

Preferably, the cross-linking operation inter-bonds the continuous phase and the dispersed phase with at least one inter-bonding molecule corresponding to an elastomer-thermoplastic polymer according to Formula I. In this regard, A is an elastomeric moiety from a free radical polymeric derivative derived from an elastomer molecule of the dispersed phase where A has a collective atomic weight of from about 350 to about 10,000,000; and D is from a free radical polymeric derivative of a thermoplastic molecule from the continuous phase, the thermoplastic molecule having a molecular weight of from about 120 to about 10,000,000.

In one embodiment of this method, the dispersed phase is elastomer of any of fluoroelastomer, acrylic acid ester rubber/polyacrylate rubber, ethylene acrylic rubber, silicone, nitrile butyl rubber, hydrogenated nitrile rubber, natural rubber, ethylene-propylene-diamine monomer rubber/polypropylene thermoplastic vulcanizate, polyurethane, and combinations thereof.

In one embodiment of this method, the thermoplastic polymer is any of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyester-etherketone, polyimide, fluoroplastic, polyvinylidene fluoride, polysulfone, polycarbonate, polyphenylene sulfide, polyethylene, polypropylene, polyacetal polymer, polyacetal, perfluoroalkoxy (tetrafluoroethylene/perfluoromethylvinyl ether), tetrafluoroethylene/perfluoromethylvinyl ether, ethylene tetrafluoroethylene, ethylene chlorotrifluoroethylene, tetrafluoroethylene/hexafluoro-propylene/vinylidene fluoride, tetrafluoroethylene/hexafluoropropylene, polyester thermoplastic ester, polyester ether copolymer, polyamide ether copolymer, polyamide thermoplastic ester, and combinations thereof.

In one embodiment, the cross-linking is achieved by irradiating the dispersed and continuous phases with electron beam radiation (preferably of from about 0.1 MeRAD to about 40 MeRAD and, more preferably, from about 5 MeRAD to about 20 MeRAD).

In one embodiment, the cross-linking is achieved by irradiating the dispersed and continuous phases within a cavity of the previously described mold, where the housing of the mold enables transmission of an electron beam from an outside surface of the housing through a surface of the cavity and thereby to the dispersed and continuous phases.

In one embodiment, each of the elastomeric portions are admixed to provide a cross-sectional diameter (in either essentially spherical or filament formed portions) from about 0.1 microns to about 100 microns.

In one embodiment, the dispersed phase provides from about 20 weight percent to about 90 weight percent of the admixture.

In yet another method embodiment, a composition is made by
(a) admixing a dispersed phase of a plurality of thermoplastic portions into a continuous phase of elastomer; and
(b) cross-linking the continuous and dispersed phases.

Preferably, the cross-linking operation inter-bonds the continuous phase and the dispersed phase with (at least one) inter-bonding molecule(s) corresponding to an elastomer-thermoplastic polymer according to Formula I. In this regard, A is an elastomeric moiety from a free radical polymeric derivative derived from an elastomer molecule of the dispersed phase where A has a collective atomic weight of from about 350 to about 10,000,000; and D is from a free radical polymeric derivative of a thermoplastic molecule from the continuous phase, the thermoplastic molecule having a molecular weight of from about 120 to about 10,000,000.

In one embodiment of this method, the continuous phase is elastomer of any of fluoroelastomer, acrylic acid ester rubber/polyacrylate rubber, ethylene acrylic rubber, silicone, nitrile butyl rubber, hydrogenated nitrile rubber, natural rubber, ethylene-propylene-diamine monomer rubber/polypropylene thermoplastic vulcanizate, polyurethane, and combinations thereof.

In one embodiment of this method, the thermoplastic polymer is any of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyesteretherketone, polyimide, fluoroplastic, polyvinylidene fluoride, polysulfone, polycarbonate, polyphenylene sulfide, polyethylene, polypropylene, polyacetal polymer, polyacetal, perfluoroalkoxy (tetrafluoroethylene/perfluoromethylvinyl ether), tetrafluoroethylene/perfluoromethylvinyl ether, ethylene tetrafluoroethylene, ethylene chlorotrifluoroethylene, tetrafluoroethylene/hexafluoro-propylene/vinylidene fluoride, tetrafluoroethylene/hexafluoropropylene, polyester thermoplastic ester, polyester ether copolymer, polyamide ether copolymer, polyamide thermoplastic ester, and combinations thereof.

In one embodiment, the cross-linking is achieved by irradiating the dispersed and continuous phases with electron beam radiation (preferably of from about 0.1 MeRAD to about 40 MeRAD and, more preferably, from about 5 MeRAD to about 20 MeRAD).

In one embodiment, the cross-linking is achieved by irradiating the dispersed and continuous phases within a cavity of the previously described mold, where the housing of the mold enables transmission of an electron beam from an outside surface of the housing through a surface of the cavity and thereby to the dispersed and continuous phases.

In one embodiment, each of the thermoplastic portions are admixed to provide a cross-sectional diameter (in either essentially spherical or filament formed portions) from about 0.1 microns to about 100 microns.

In yet another method embodiment, a composition is made by
(a) admixing molecules of an elastomer and molecules of a thermoplastic into a polymeric admixture; and
(b) irradiating the polymeric admixture with electron beam radiation; wherein each of the elastomer molecules have a molecular weight of from about 350 to about 10,000,000, and each of the thermoplastic molecules has a molecular weight of from about 120 to about 10,000,000.

In this embodiment, the elastomer and the thermoplastic preferably initially exist as separate masses of an elastomer fluid material and a thermoplastic fluid material, with each of the two materials having essentially similar viscosities. The two fluid materials are then admixed and agitated to mutually disperse the individual molecules into a blended single phase admixture. The admixture is then irradiated to crosslink the materials and also derive at least one instance of a compound corresponding to an elastomer-thermoplastic polymer according to Formula I. In this regard, A is an elastomeric moiety from a free radical polymeric derivative derived from an elastomer molecule of the dispersed phase where A has a collective atomic weight of from about 350 to about 10,000,000; and D is from a free radical polymeric derivative of a thermoplastic molecule from the continuous phase, the thermoplastic molecule having a molecular weight of from about 120 to about 10,000,000.

In one embodiment of this method, the elastomer is any of fluoroelastomer, acrylic acid ester rubber/polyacrylate rubber, ethylene acrylic rubber, silicone, nitrile butyl rubber, hydrogenated nitrile rubber, natural rubber, ethylene-propylene-diamine monomer rubber/polypropylene thermoplastic vulcanizate, polyurethane, and combinations thereof.

In one embodiment of this method, the thermoplastic polymer is any of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyesteretherketone, polyimide, fluoroplastic, polyvinylidene fluoride, polysulfone, polycarbonate, polyphenylene sulfide, polyethylene, polypropylene, polyacetal polymer, polyacetal, perfluoroalkoxy (tetrafluoroethylene/perfluoromethylvinyl ether), tetrafluoroethylene/perfluoromethylvinyl ether, ethylene tetrafluoroethylene, ethylene chlorotrifluoroethylene, tetrafluoroethylene/hexafluoro-propylene/vinylidene fluoride, tetrafluoroethylene/hexafluoropropylene, polyester thermoplastic ester, polyester ether copolymer, polyamide ether copolymer, polyamide thermoplastic ester, and combinations thereof.

In one embodiment, the cross-linking is achieved by irradiating the admixture with electron beam radiation (preferably of from about 0.1 MeRAD to about 40 MeRAD and, more preferably, from about 5 MeRAD to about 20 MeRAD).

In one embodiment, the cross-linking is achieved by irradiating the admixture within a cavity of the previously described mold, where the housing of the mold enables transmission of an electron beam from an outside surface of the housing through a surface of the cavity and thereby to the dispersed and continuous phases.

In one embodiment, the elastomer provides from about 20 weight percent to about 90 weight percent of the admixture.

A further method embodiment related to polymer chain synthesis using irradiation (preferably electron beam) in interim free radical generation provides a path for making new types of polymers and new types of elastomers (including fluoroelastomers). In this regard, and with reference again to FIG. 1, Region 110 defines blends of respective tetrafluoroethyl, hexfluoropropyl, and vinylidyl fluoride overall block amounts that traditionally have not generated useful co-polymers. However, it is believed that, through a process of building different matrix orientations than have traditionally occurred in fluoroelastomer manufacture, new and useful fluoroelastomer compounds are now available from blends of respective tetrafluoroethyl, hexfluoropropyl, and vinylidyl fluoride overall block amounts that would fall with Region 110 (as well as in Regions 101, 104, 106, and 108) of ternary composition diagram 100 of FIG. 1.

In overview of this general approach to making new polymers, irradiation (preferably E-beam irradiation) of a type that can generate free radical sites on polymer chains at interim points between the ends of the individual chains is applicable in many diverse polymeric blends and in polymer chain synthesis where the polymer chain is built with periodic free radical generation on the oligomer and precursor interim polymeric chains (between the endpoints) during polymeric synthesis. Example embodiments of materials and admixtures for such treatment include non-FKM elastomers/fluoroplastics oligomer mixtures, FKM elastomers/non-fluoroplastic thermoplastics (TP) or thermoplastic elastomers (TPE) oligomer mixtures, polyurethane (PU) elastomers/thermoplastic (TP) or thermoplastic elastomers (TPE) oligomer mixtures, ACM or AEM elastomers/thermoplastic (TP) or thermoplastic elastomers (TPE) oligomer mixtures, silicone elastomers/thermoplastic (TP) or thermoplastic elastomers (TPE) oligomer mixtures, NBR or HNBR elastomers/thermoplastic (TP) or thermoplastic elastomers (TPE) oligomer mixtures, EPDM elastomers/thermoplastic (TP) oligomer mixture, and the like. Exemplary embodiments of low molecular weight thermoplastics in this regard also include cyclic butylene terephthalate (CBT) and poly cyclohexylene dimethylene terephthalate (PCT) oligomers.

In additional embodiments, the same concepts pertain to yet other low molecular weight elastomers and other low molecular weight thermoplastics. Example embodiments of materials and admixtures for such treatment include ACM, AEM, PU, silicone (MVQ), HNBR, EPDM, NBR, natural rubber, and the like. Example embodiments of thermoplastic oligomers materials and admixtures for such treatment include cyclic butylene terephthalate (CBT) oligomers, poly cyclohexylene dimethylene terephthalate (PCT) oligomers, and the like. Exemplary fluoro-plastics include polyvinylidene fluoride, ethylene tetrafluoroethylene, ethylene chlorotrifluoro-ethylene, tetrafluoro-ethylene/hexafluoropropylene, tetrafluoroethylene/hexafluoropropylene/vinylidene fluoride, tetrafluoroethylene/perfluoromethylvinyl ether, perfluoroalkoxy (tetrafluoroethylene/perfluoromethylvinyl ether), and the like. Exemplary TPEs include AtoFina's Pebax, DuPont's Hytrel, Shell's Kraton, BASF's Esthane, AES's Santoprene, DSM's Sarlink, etc. Exemplary non-fluoroplastic thermoplastics (TP) include polyamides (nylons), polyesters, polyolefins, PPS, PEEK, Torlon, polysulfone, TPUs, ABS, PVC, PS, PMMA, PC, PB, cellulosic plastics, polyacrylics, polyacetals, and the like. Exemplary thermoset materials include phenolic resin, melamine-formaldehyde resin, epoxy resin, and the like.

There are several embodiments enabled in this approach of polymer chain synthesis using irradiation (preferably electron beam) in interim free radical generation. One embodiment admixture has (a) a first elastomer selected from the group of fluoroelastomer, acrylic acid ester rubber/polyacrylate rubber, ethylene acrylic rubber, silicone, nitrile butyl rubber, hydrogenated nitrile rubber, natural rubber, ethylene-propylene-diamine monomer rubber/polypropylene thermoplastic vulcanizate, and polyurethane;

(b) a second elastomer from same group, but where the second elastomer is a different elastomer from the first elastomer; and (c) polymer compounds having at least one first moiety (having a collective atomic weight of from about 350 to about 10,000,000) derived from a free radical polymeric derivative derived from the first elastomer, and at least one second moiety (also having a collective atomic weight of from about 350 to about 10,000,000) from a free radical polymeric derivative derived from the second elastomer. The first elastomer and all instances of the first moiety in the bi-elastomeric polymer compound(s) of this embodiment combine to provide from about 5 weight percent to about 95 weight percent of the admixture composition. This embodiment is made by admixing the first elastomer and second elastomer into an primary admixture, and irradiating the primary admixture.

Another embodiment admixture has (a) a first thermoplastic selected from the group of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyester-etherketone, polyimide, fluoroplastic, polyvinylidene fluoride, polysulfone, polycarbonate, polyphenylene sulfide, polyethylene, polypropylene, polyacetal, perfluoroalkoxy (tetrafluoroethylene/perfluoromethylvinyl ether), tetrafluoroethylene/perfluoromethylvinyl ether, ethylene tetrafluoroethylene, ethylene chlorotrifluoroethylene, tetrafluoroethylene/hexafluoropropylene/vinylidene fluoride, tetrafluoroethylene/hexafluoropropylene, polyester thermoplastic ester, polyester ether copolymer, polyamide ether copolymer, and polyamide thermoplastic ester;

(b) a second thermoplastic from same group, but where the second thermoplastic is a different thermoplastic from the first thermoplastic; and (c) polymer compounds having at least one first moiety (having a collective atomic weight of from about 120 to about 10,000,000) from a free radical polymeric derivative derived from the first thermoplastic, and at least one second moiety (having a collective atomic weight of from about 120 to about 10,000,000) from a free radical polymeric derivative derived from the second thermoplastic. The first thermoplastic and all instances of the first moiety in the bi-thermoplastic polymer compound(s) of this embodiment combine to provide from about 5 weight percent to about 95 weight percent of the admixture composition. This embodiment is made by admixing the first thermoplastic and second thermoplastic into an primary admixture, and irradiating the primary admixture.

Turning to particular fluoropolymer and/or fluoroelastomer embodiments, with respect to the alternative structures enabled by irradiation at the critical oligomer stage, it is also believed that, through a process of building different matrix orientations than have traditionally occurred in fluoroelastomer manufacture in the blends of tetrafluoroethyl, hexfluoropropyl, and vinylidyl fluoride overall block amounts traditionally used in fluoroelastomers, that new and useful fluoroelastomer compounds in a new structural context are now available from blends of respective tetrafluoroethyl, hexfluoropropyl, and vinylidyl fluoride overall block amounts that would fall within Region 101 of ternary composition diagram 100 of FIG. 1. Indeed new fluoroelastomer or fluoropolymer materials should result from tetrafluoroethyl, hexfluoropropyl, and vinylidyl fluoride overall block amounts that would fall with any of Regions 101, 102, 104, 106, 108, and 110 of ternary composition diagram 100 of FIG. 1. The electron beam irradiation triggers the curing (cross-linking) reaction in the FKM oligomer phase or stage by generating free radical sites, as previously occupied by fluorine molecules on the FKM oligomer molecular chains. In generating free radical sites on subsequent precursor polymer chains (larger than the oligomer stage but still premature respective to the ultimate desired chain length), the electron beam derives a free radical sites as previously occupied by fluorine molecules on the FKM precursor molecular chain.

The benefits of irradiation (preferably E-beam irradiation) include improved flow characteristics (due to a lower viscosity and lower melting point in branched chain polymers respective to the viscosity in straight chained polymers of comparable molecular weight) and processability (due to a lower processing temperature and pressure respective to the processing temperature and pressure for straight chained polymers of comparable molecular weight). Additionally, surface and internal textures are comparably improved with an elimination of the need for chemical curing agents and/or chemical curing packages (insofar as such agents/packages generate undesirable gases as they react during processing). The curing process can be executed in situ in a mold by using an E-beam compatible (penetrable) mold of glass or thin metal or ceramic. Physical properties and chemical resistance of E-beam cured FKM elastomers are adjustable respective to molecular weight and the degree of cross-linking density achieved with each irradiative treatment during the E-beam augmented curing process. The irradiative curing approach eliminates, in one embodiment, post cure curing processes and also enables FKM elastomers to be molded and cured without the addition of expensive cure-site monomers (CSM) or chemical curing packages needed in traditional curing techniques.

Other properties, such as tensile properties, wear properties, compression set, service temperature, heat deflection temperature, dynamic fatigue resistance, fluid (chemical) resistance, creep resistance, and the like are beneficially adjusted in various branched chain polymeric embodiments respective to the comparable properties in the traditional essentially linear polymer structures. In one application embodiment, for example, E-beam cured seals of an FKM oligomer/fluoroplastic oligomer mixture provide superior seal performance characteristics to seals made of chemically cured conventional FKM-TPV with high molecular weight FKM elastomer and fluoroplastic blends.

In one embodiment of a method for using irradiatively augmented polymerization,
(a) tetrafluoroethylene (TFE), hexfluoropropylene (HFP), and vinylidene fluoride (VdF) are admixed in proportions according to values within Region 110 of FIG. 1 so that a reaction admixture is formed;
(b) the reaction admixture is then reacted to generate a set of fluoropolymeric oligomers (an oligomer is a polymer compound which is built from about 2 to about 5 monomer units) within the reaction admixture and form thereby a fluoropolymeric oligomeric precursor admixture;
(c) the fluoropolymeric oligomeric precursor admixture is then irradiated to form free radical sites on individual fluoropolymeric oligomers of the set and generate thereby a set of free radical oligomer derivatives in the fluoropolymeric oligomeric precursor admixture; and
(d) the fluoropolymeric oligomeric precursor admixture is further reacted to derive the fluoroelastomer compound from the free radical oligomer derivatives.

In an alternative embodiment of such a method
(a) tetrafluoroethylene (TFE), hexfluoropropylene (HFP), and vinylidene fluoride (VdF) are admixed in proportions according to values within Region 101 of FIG. 1 so that a reaction admixture is formed;
(b) the reaction admixture is then reacted to generate a set of fluoropolymeric oligomers (an oligomer is a polymer compound which is built from about 2 to about 5 monomer units) within the reaction admixture and form thereby a fluoropolymeric oligomeric precursor admixture;
(c) the fluoropolymeric oligomeric precursor admixture is then irradiated to form free radical sites on individual fluoropolymeric oligomers of the set and generate thereby a set of free radical oligomer derivatives in the fluoropolymeric oligomeric precursor admixture; and
(d) the fluoropolymeric oligomeric precursor admixture is further reacted to derive the fluoroelastomer compound from the free radical oligomer derivatives.

In one embodiment of either of the above methods, the subsequent interim polymers (larger than the oligomer stage but less than the eventually-desired molecular weight) are irradiated to further generate free radical sites at least one additional interim molecular weight in the continued molecular weight increase of the polymerizing fluoropolymers.

Turning now to a method embodiment for making a composite, a composite is made by
(a) providing a first layer of structural material (metal, polymer, or ceramic);
(b) positioning a solid adhesive layer of polymer onto the first layer;
(c) positioning a second layer of structural material (metal, polymer, or ceramic); and
(d) irradiating the first layer, the second layer, and the adhesive layer with electron beam radiation sufficient to inter-bond the first layer to the adhesive layer and to inter-bond the second layer to the adhesive layer.

In one embodiment, the irradiating is achieved by irradiating the dispersed and continuous phases with electron beam radiation (preferably of from about 0.1 MeRAD to about 40 MeRAD and, more preferably, from about 5 MeRAD to about 20 MeRAD).

In one embodiment, the adhesive layer is bonded to the structural material of the first layer with at least one first inter-bonding molecule corresponding to Formula IV, and the adhesive layer is also bonded to the structural material of the second layer with at least one second inter-bonding molecule corresponding to the Formula V. In this embodiment, the adhesive layer has a characteristic performance property (such as, for example without limitation tensile strength, elongation, modulus, and chemical resistance) superior to the performance property of either of the first or second layer. In this regard, the composite will fail, respective to the particular concern addressed by the performance property, on the basis of the performance of the layers rather than the performance of the adhesive. So, for instance, separation of the composite under a force beyond the design capability of the composite should occur within either the first or second layers rather than in the adhesive layer. Such a benefit in composite construction is frequently not achievable with adhesives that spread or flow into position and then are cured or otherwise solidified to bond to the outer layers of the composite.

In one embodiment, the polymer of the adhesive layer is any of fluoroelastomer, acrylic acid ester rubber/polyacrylate rubber, ethylene acrylic rubber, silicone, nitrile butyl rubber, hydrogenated nitrile rubber, natural rubber, ethylene-propylene-diamine monomer rubber/polypropylene thermoplastic vulcanizate, polyurethane, and combinations thereof.

In an alternative embodiment, the polymer of the adhesive layer is selected from the group consisting of acrylic acid ester rubber/polyacrylate rubber thermoplastic vulcanizate acrylonitrile-butadiene-styrene, amorphous nylon, cellulosic plastic, ethylene chlorotrifluoro-ethylene, epoxy resin, ethylene tetrafluoroethylene, ethylene acrylic rubber, ethylene acrylic rubber thermoplastic vulcanizate, ethylene-propylene-diamine monomer rubber/polypropylene thermoplastic vulcanizate, tetrafluoroethylene/hexafluoropropylene, fluoroelastomer, fluoroelastomer thermoplastic vulcanizate, fluoroplastic, hydrogenated nitrile rubber, melamine-formaldehyde resin, tetrafluoroethylene/perfluoromethylvinyl ether, natural rubber, nitrile butyl rubber, nylon, nylon 6, nylon 610, nylon 612, nylon 63, nylon 64, nylon 66, perfluoroalkoxy (tetrafluoroethylene/perfluoromethylvinyl ether), phenolic resin, polyacetal, polyacrylate, polyamide, polyamide thermoplastic elastomer, polyamide-imide, polybutene, polybutylene, polycarbonate, polyester, polyester thermoplastic elastomer, polyesteretherketone, polyethylene, polyethylene terephthalate, polyimide, polymethylmethacrylate, polyolefin, polyphenylene sulfide, polypropylene, polystyrene, polysulfone, polytetrafluoroethylene, polyurethane, polyurethane elastomer, polyvinyl chloride, polyvinylidene fluoride, ethylene propylene dimethyl/polypropylene thermoplastic vulcanizate, silicone, silicone-thermoplastic vulcanizate, thermoplastic polyurethane, thermoplastic polyurethane elastomer, thermoplastic polyurethane vulcanizate, thermoplastic silicone vulcanizate, thermoplastic urethane, thermoplastic urethane elastomer, tetrafluoroethylene/hexafluoropropylene/vinylidene fluoride, polyamide-imide, and combinations thereof.

In one embodiment, a curing agent is admixed into the polymer of the adhesive layer.

In one embodiment, the polymer of the polymer of any of the first layer and the second layer is halogenated plastic and the adhesive layer corresponds to Formula II.

In one embodiment, within a cavity of the previously described mold, where the housing of the mold enables transmission of an electron beam from an outside surface of the housing through a surface of the cavity and thereby to the composite.

In one embodiment, positioning of the second layer further involves compressing the first layer and the second layer against the adhesive layer.

An embodiment of a method for surface preparation of any item (such as a halogenated polymer surface of a composite precursor assembly) is provided by etching an article made of halogenated polymer through the process of (a) etching a surface of the article with an electron beam; and (b) placing the surface in an inert environment at a predetermined temperature;

where the electron beam energizes the surface with sufficient energy for dislodging a plurality of halogen atoms from the halogenated polymer of the surface and for generating thereby a set of initial residual free radical sites in polymeric chains of the surface upon conclusion of the etching, and the inert environment and the predetermined temperature are established to sustain at least 99 percent of the free radical sites of the set of initial residual free radical sites for at least 4 hours.

In one embodiment, the inert environment and the predetermined temperature are sufficient for sustaining at least 90 percent of the free radical sites of the set of initial residual free radical sites for at least 8 hours.

In one embodiment, the inert environment is a noble gas. In another embodiment, the inert environment is high purity nitrogen. In yet another embodiment, the pressure of the inert environment is less than 0.1 atmospheres. In yet another embodiment, a vacuum is applied to the etched material surface. In yet another embodiment, a static free environment is enabled at the etched material surface.

In one embodiment, the cross-linking is achieved by irradiating the assembled layers with electron beam radiation (preferably of from about 0.1 MeRAD to about 40 MeRAD and, more preferably, from about 5 MeRAD to about 20 MeRAD).

The presence of inter-bonding molecules in the described embodiments is detected and confirmed subsequent to irradiation (preferably electron beam irradiation) treatment by use of techniques such as X-ray Diffraction, Fourier transform infrared analysis, gel permeation chromatography, and nuclear magnetic resonance such as either of Fluorine 19 Nuclear Magnetic Resonance ($F_{19}$ NMR) and Carbon 13 Nuclear Magnetic Resonance ($C_{13}$ NMR).

In some embodiments, the polymeric compositions are analyzed or purified by a process of contacting the material with a ketone type polar solvent (such as methyl-ethyl ketone or acetone) to disperse the polymeric molecules into solution. A "weak" solvent is used for dissolution of oligomer samples during polymerization, and a "strong" solvent for dissolution of mature polymer chains of greater molecular weight. Chromatography or another diffusive separation technique is then used to purify and/or analyze for particular molecular components in the solution.

Some composite embodiments also benefit from having polytetrafluoroethylene as a structural material as further prepared with synthesized polymer chains (especially from materials having a halogenated polymer phase or portion) from a process initiated with free radical formation derived from irradiation (especially electron beam radiation). However, these composite embodiments do not benefit from the use of a solid (essentially non-flowable) adhesive; so challenges akin to making a peanut butter sandwich must be endured. These embodiments do, however, facilitate incorporation of polytetrafluoroethylene into the composite for certain applications, and the superior performance properties of polytetrafluoroethylene are well worth the effort needed to handle the flowable adhesive involved.

In one embodiment of such a composite where adhesive is deposited as a liquid material, the adhesive is a bonding material for adhering an item made of PTFE to another structural item (to a second item made of non-PTFE (polymer, wood, ceramic, leather, or metal) with a very good bond. This bonding material provides a "handle" to "link" to free radical bonds in the PTFE surface to be bonded. The number of the free radical bonds in the PTFE surface is dramatically increased when the surface is etched (preferably by irradiation with an electron beam) to remove a substantial portion of the fluorine radicals from the PTFE chains in the surface. The other mission of the bonding material is to provide a "handle" for linking the PTFE chains to the (second) structural material; this is usually less difficult than linking to PTFE because most structural materials have enough surface tension to "stick" to at least some generally adhesive polymers. Finally, the bonding material needs to be internally coherent so that the "handles" to the PTFE part of the composite and the "handles" to the structural material part of the composite are themselves held directly or indirectly in close proximity. Since the bonding material is generally spread as a coating onto the components to be joined into the composite, it is convenient for the bonding material to be in the initial form of a liquid having a viscosity that facilitates the spreading or coating operation.

In one embodiment, the structural support material portion of a composite (the structural support material portion made of non-PTFE polymer, wood, ceramic, or metal) is bonded to an etched surface of the PTFE portion of the composite (the PTFE article) at an interface essentially filled with cured admixture of from about 10 to about 90 weight percent (preferably from about 20 to about 60 weight percent; more preferably about 50 weight percent) tetrafluoroethylene-hexafluoropropylene-vinylidene fluoride terpolymer, from about 0.01 to about 1 weight percent polyethylene-oxide-modified silicone polymer coupling agent, not more than 1 weight percent water, and a remainder of oxygen-radical-containing copolymer. In this regard, the oxygen-radical-containing copolymer has at least one "oxy" or —O— radical (oxygen atom radical having 2 bonds attached to two respective other atoms) in the characteristic polymer molecule. In this regard, the oxygen-radical-containing copolymer molecule is, In one embodiment, a cured epoxy polymer or cured phenoxy where the "oxy" radical provides a link between two other carbon atoms in the polymer chain. In another embodiment, the oxygen-radical-containing copolymer is a hydroxylated diamine-diepoxide derivative copolymer molecule, where the "oxy" radical is in hydroxyl radicals of the polymer chain. In such a copolymer molecule, each of the two nitrogen radicals of a diamine is, for example, connected to two separate hydroxylated carbon chain moieties in the general matrix of the crosslinked polymer macromolecule.

The cured admixture (of from about 10 to about 90 weight percent tetrafluoroethylene-hexafluoropropylene-vinylidene fluoride terpolymer, from about 0.01 to about 1 weight percent polyethylene-oxide-modified silicone polymer coupling agent, not more than 1 weight percent water, and a remainder of oxygen-radical-containing copolymer) results from dewatering and curing of an aqueous admixture that was coated onto the etched surface and then cured. This aqueous admixture is admixed from about 10 to about 90 weight percent (preferably from about 20 to about 60 weight percent; more preferably about 50 weight percent) fluoropolymer aqueous emulsion and a remainder of oxygen-radical-containing copolymer aqueous solution.

The fluoropolymer aqueous emulsion has from about 20 to about 60 weight percent (preferably from about 46.5 to about 51.5 weight percent) tetrafluoroethylene-hexafluoropropylene-vinylidene fluoride emulsified terpolymer, a pH from about 6 to about 10 (preferably from about 8 to about 9), a specific gravity from about 1.1 to about 1.5 grams per milliliter, and a viscosity from about 4 to about 12 Mega Pascal Seconds (preferably from about 9 to about 10 Mega Pascal Seconds). One source of this is tetrafluoro-ethylene/hexafluoropropylene/vinylidene fluoride Fluorothermoplastic from Dyneon LLC (Oakdale, Minn.) under the product identifier tetrafluoroethylene/hexafluoropropylene/vinylidene fluoride-350C. tetrafluoro-ethylene/hexafluoropropylene/vinylidene fluoride-350C provides fluoropolymer aqueous emulsion having tetrafluoroethylene-hexafluoropropylene-vinylidene fluoride terpolymer from about 46.5 to about 51.5 weight percent, a pH from about 8 to about 9, and a viscosity from about 9 to about 10 Mega Pascal Seconds.

Turning now to the oxygen-radical-containing copolymer aqueous solution with is admixed with the fluoropolymer aqueous emulsion to form the aqueous admixture, the oxygen-radical-containing copolymer aqueous solution has (1) from about 20 to about 60 weight percent oxygen-radical-containing copolymer having a softening temperature of from about 25 to about 180 degrees Celsius (preferably from about 65 to about 155 degrees Celsius), a specific gravity from about 1.1 to about 1.5 grams per milliliter, and an estimated equivalent molecular weight from about 100 to about 10,000 (preferably from about 450 to about 3000), The oxygen-radical-containing copolymer is, in various embodiments, any of an epoxy polymer, a phenoxy polymer, or a hydroxylated diamine-diepoxide derivative copolymer, and (2) from about 0.01 to about 1 weight percent (preferably from about 0.05 to about 0.5 weight percent) polyethylene-oxide-modified silicone polymer coupling agent having a wax melting temperature of from about 25 to about 50 degrees Celsius (preferably from about 25 to about 45 degrees Celsius).

One embodiment of an epoxy-polymer-based oxygen-radical-containing copolymer aqueous solution is Chemlock™ aqueous epoxy silane solution from Lord Corporation. Another embodiment is made by blending an epoxy resin (such as any of GT 7071, GT 7072, GT 7014, GT 6097, or GT 6609 epoxy resins from Ciba Corporation) with CoatOSil™ 2400 polyethylene-oxide modified silicone copolymer coupling agent from Crompton Corporation. Estimated equivalent molecular weights for GT 7071, GT 7072, GT 7014, GT 6097, and GT 6609 epoxy resins vary progressively from about 450 (GT 7071) to about 2,800 (GT 6609).

In other embodiments, the oxygen-radical-containing copolymer is alternatively a hydroxylated diamine-diepoxide derivative copolymer or a phenoxy. In the case of a phenoxy, the estimated equivalent molecular weight is as high as 10,000. In each embodiment of a composite, the particular physical properties of the oxygen-radical-containing copolymer and polyethylene-oxide-modified silicone polymer coupling agent are pinpointed to provide efficacy with the particular material used for the support component.

In alternative embodiments, the structural support material portion respectively is made of a polymer of any of polyester thermoplastic elastomer (such as Dupont's Hytrel™ polyester elastomer), polyamide thermoplastic elastomer (such as Atofina's Pebax™ polyamide thermoplastic elastomer), thermoplastic urethane elastomer, fluoroelastomer, ethylene acrylic rubber thermoplastic vulcanizate (such as a Dupont experimental AEM-TPV also commonly known as ETPV), acrylic acid ester rubber/polyacrylate rubber thermoplastic vulcanizate (such as Zeon Chemical's Zeotherm™ acrylic acid ester rubber/polyacrylate rubber thermoplastic vulcanizate), silicone-thermoplastic vulcanizate (such as a Dow Corning experimental VMQ-TPV also commonly known as TPSiV), polyether-block co-polyamide polymer (such as Modified Polymer Components' Pebax™ polyether-block co-polyamide resin), ethylene-propylene-diamine monomer rubber/polypropylene thermoplastic vulcanizate (such as Advanced Elastomeric System's Santoprene™ vulcanizate), polyamide, polyester, polyolefin, polyphenylene-sulfide, polyether-ether ketone, polyamide-imide, polysulfone, thermoplastic urethane, acrylonitrile-butadiene-styrene, polyvinyl chloride, polymethylmethacrylate, polycarbonate, polybutene, cellulosic plastic, polyacrylate, or polyacetal. Polymers made of combinations of these are used in other embodiments.

In yet further embodiments, the structural support material portion is made of any of steel, carbon steel, stainless steel, brass, bronze, or aluminum.

Turning now to the process by which a polytetrafluoroethylene portion and a structural support material portion are bonded together into a composite, a surface of the polytetrafluoroethylene portion (article) is etched to generate residual fluoroethylenic free radical moieties in polytetrafluoroethylene polymeric chains of the surface. This is achieved In one embodiment, by chemical etching, and, in another embodiment, the etching is achieved with a beam bombardment approach. In the case of chemical etching, sodium-ammonia solution etching or sodium-naphthalene solution etching is used. In the case of beam bombardment, any of plasma bombardment etching, electron-beam etching, and laser etching is used.

In beam bombardment embodiments, any of a plasma beam, an electron-beam (the preferable source of irradiation), or a laser beam is generated and then applied to the PTFE surface with sufficient energy for dislodging a plurality of fluoride atoms from the polytetrafluoroethylene of the surface so that residual fluoroethylenic free radical moieties are generated in polytetrafluoroethylene polymeric chains of the surface.

After the surface is etched, an embodiment of an aqueous admixture as described above is saturatively distributed onto the etched surface. Saturative distribution of the aqueous admixture involves both coating the aqueous admixture on the general etched surface and then, very importantly, providing conditions to enable the aqueous admixture to comprehensively penetrate to achieve contact with the available bonds of the residual fluoroethylenic free radical moieties generated by the etching. In this regard, the aqueous admixture, In one embodiment, is heated; in another embodiment, the aqueous admixture is pressurized against the etched surface; in yet another embodiment, the aqueous admixture is pressurized against the etched surface and also heated.

In one embodiment, the aqueous admixture is coated on the etched surface to provide an aqueous admixture coating having from about 0.0005 to about 0.01 inches thickness (preferably from about 0.0005 to about 0.005 inches thickness). The aqueous admixture coating is then pressurized against the etched surface (In one embodiment, by "squeezing" the aqueous admixture between the PTFE surface and the structural support material portion) for at least 3 minutes at from about 0.5 to about 10 pounds per square inch pressure and from about 25 to about 100 degrees Celsius temperature.

In one embodiment, the water in the aqueous admixture is diminished as a result of heat and pressure application over time in the saturative distribution operation. In an alternative embodiment a process such as vacuum evaporation is used to diminish water after the saturative distribution operation. The water is decreased in all embodiments to a level of not more than 1 weight percent in the aqueous admixture coating.

If the structural support material portion has not yet been positioned against the residual dewatered aqueous admixture, it is now so positioned. In this regard, the structural support material article is positioned against the (residual, if dewatered) aqueous admixture on the etched surface so that the aqueous admixture fluidly fills the interface between the structural support material article and the etched surface.

The residual dewatered aqueous admixture (aqueous admixture with not more than 1 weight percent water) coating is then cured. In this regard, tetrafluoroethylene-hexafluoropropylene-vinylidene fluoride terpolymer has a melting temperature and the etched surface and residual aqueous admixture on the etched surface are heated to at least that melting temperature for a time sufficient for curing the various polymers so that they bond to both the PTFE portion and the structural support material portion of the composite.

In one embodiment, cured admixture is achieved by heating under pressure such that the etched surface and the residual (dewatered) aqueous admixture on the etched surface are sustained at temperature of at least 190 degrees Celsius and at a pressure of at least 75 pounds per square inch for a time period of at least 10 minutes.

In alternative embodiments, positioning of the structural support material portion against the residual dewatered aqueous admixture is achieved by various respective processes. Traditional processes such a calendaring, pultrusion, multilayer extrusion, and co-injection molding are used in alternative process embodiments to achieve manufacture of the desired composite. In the case of calendaring, the positioning and dewatering steps are substantively combined and then pressure and temperature are further adjusted to effect curing and bonding.

In one embodiment of pultrusion, a PTFE pipe-form is etched and then coated with the aqueous admixture, the aqueous admixture is saturatively distributed in a pressure chamber, the water is adjusted (removed) in a vacuum distillation, and the PTFE pipe-form with saturatively distributed and dewatered residual aqueous admixture is propelled through a pultrusion die to acquire an outside coating of (polymeric) structural support material which is then cured along with the curing of the admixture.

In one embodiment of co-injection molding, a PTFE article is coated with the aqueous admixture, the aqueous admixture is saturatively distributed in a pressure chamber, the water is adjusted (removed) in a vacuum distillation, and the PTFE article with saturatively distributed and dewatered residual aqueous admixture is placed into an injection mold. Structural support material is then injected against the residual aqueous admixture and held under pressure until both it and the residual aqueous admixture have cured.

One application of compositional and method embodiments described herein is for making a sealant article such as seal for a rotating shaft. In one embodiment, an admixture with inter-bonded molecules according to Formula I is used for the material of the shaft. In an alternative embodiment, a composite with inter-bonded molecules according to any of Formula IV and Formula V is used for the material of the shaft. In yet another embodiment, a composite of PTFE and Hytrel™ polyester are joined into a composite with an oxygen-radical-containing copolymer solution as described herein, and a contact surface for contacting the shaft in dynamic rotation is machined into the PIFE portion of the composite. In operation of the latter embodiment, the Hytrel™ polyester structurally stabilizes the composite as the PTFE shaft contact surface lightly bears against the rotating shaft.

A second application of compositional and method embodiments described herein is for making a laminate diaphragm sealant article for a diaphragm pump. In one embodiment, an admixture with inter-bonded molecules according to Formula I is used for the diaphragm. In an alternative embodiment, a flexible composite with inter-bonded molecules according to any of Formula IV and Formula V is used for the diaphragm. In yet another embodiment, a composite of robust laminar sheet is bonded to a PTFE sheet with an oxygen-radical-containing copolymer solution as described herein. In operation of the latter embodiment, the polytetrafluoroethylene article provides a contact surface for interfacing to fluid pumped by the pump, and the robust laminar sheet provides dimensional strength to protect the PTFE sheet from stretching or tearing.

Yet other applications (article embodiments) are for other packing sealant articles such as gaskets, dynamic seals, static seals, o-rings, co-extruded hose, and items having a sealant article such as a hose for handling chemicals or fuels where the inner layer of the hose has the chemical resistance properties of a PTFE "lining". Other application (article) embodiments include encoders and co-extruded fuel hose.

In one embodiment of making any of these or other articles, an article is made by admixing an elastomer and thermoplastic blend as previously described, forming the admixed composition into a shaped item for the desired article; and irradiating the shaped item to cross-link the various continuous and dispersed phases or to generate the new molecules such as described in any of Formula I, Formula II, and Formula III.

In still another embodiment, where an admixture composition such as a TPV or TPE is acquired for use, an article is made by forming a shaped item for said article from the elastomer and thermoplastic admixture composition and irradiating the shaped item to crosslink the various continuous and dispersed phases or to generate the new molecules such as described in any of Formula I, Formula II, and Formula III.

EXAMPLES

In a first set of Examples, a mixture of tetrafluoroethylene/hexafluoropropylene/vinylidene fluoride emulsion (Dyneon tetrafluoroethylene/hexafluoropropylene/vinylidene fluoride-340C) in aqueous base and epoxy-based aqueous silane solution is formulated to evaluate bonding of etched PTFE and Hytrel type TPE (2022HS grade, polyester-based TPE from DuPont) samples. The epoxy-based aqueous silane solution is prepared by combining epoxy resin (Vantico™ GT grades from Ciba) and polyethylene oxide (PEO) modified silicone copolymer as a coupling agent for the silicone to the epoxy. The 50/50 (on a weight basis) mixture of tetrafluoroethylene/hexafluoropropylene/vinylidene fluoride emulsion and epoxy-based silicone solution is applied both to a surface of etched PTFE and to a surface of a Hytrel sample. Eight samples of etched PTFE specimens independently etched either by chemical means (sodium ammonia and sodium naphthalene) or by physical mean (plasma) on the bonding surface of PTFE are prepared.

Application of wet adhesive is controlled to provide a total (wet) adhesive layer thickness of about 1.5 mils between the etched PTFE and Hytrel™ surfaces after they are combined into a composite sample.

Each (composite) PTFE-adhesive-TPE sample is placed in a 60 degrees C. oven with a 5 lb weight on top of the combined part for 5 minutes so that (1) the adhesive layer dries with the PTFE and Hytrel™ parts in position for the composite, and (2) the adhesive layer is uniformly distributed along the contours of the interfacing sample surfaces. Each composite sample is then placed between two heated plates, set at 188 degrees C., in a hydraulic press. A constant pressure of 75 psi is applied to the composite part. The residence time in the press is about 10 minutes.

Adhesion strength is tested manually using a "hand pull". The test results are summarized in Table 1. In interpreting the results of Table 1, a "Weak Bond" identifies a result where the composite separates at its interface in response to a relatively low impulse force against the bond; a "Partial Bond" identifies a result where the composite is robust under a steadily increased pull, but the composite separates when a strong acute impulse is exerted against the bond; a "Strong Bond" identifies a result where the composite is robust under both a steadily increased pull and a strong acute impulse. It is also to be noted that Sample A is a benchmark sample etched for a relatively brief time respective to the potential range of times normally used for sodium naphthalene etching of PTFE.

TABLE 1

| Sample | Etching Type | Etching Medium | Results |
|---|---|---|---|
| A | Chemical Etch | Sodium Naphthalene | Partial Bond |
| B | Chemical Etch | Sodium Ammonia | Partial Bond |
| C | Chemical Etch | Sodium Ammonia | Weak Bond |
| D | Chemical Etch | Sodium Ammonia | Partial Bond |
| E | Chemical Etch | Sodium Ammonia | Strong Bond |
| F | Chemical Etch | Sodium Ammonia | Partial Bond |
| G | Chemical Etch | Sodium Ammonia | Partial Bond |
| H | Physical Etch | Plasma Beam | Weak to Partial Bond |

Generally speaking, this adhesive formulation shows effectiveness in bonding sodium ammonia etched PTFE to Hytrel™ type TPE.

In a second set of Examples, shaft seal wafers are injection molded in a shaft seal mold using fluoroelastomer thermoplastic vulcanizate (FKM-TPV) materials. Two FKM-TPV formulations are used: one without a wear package and the other with a wear package. The molded shaft seal wafers are then clamped between two metal shaft-housing cases. The center portion of each of the seal wafers is trimmed, each seal wafer is placed into its respective test shaft, and the wafers are then heat-treated to release residual stresses frozen into their polymeric matrices during the injection molding process. Heat treatment is then executed on the test seal wafers for 4 hours in the oven at 150° C. Selected heat-treated seals are then exposed to electron beam radiation at 6 and 18 MeRAD dosages. A seal durability test is then executed on each prepared seal using a shaft seal wear tester operating at 2,500 RPM and at 135 degrees Celsius with gear oil (SAE 75W-90) in the oil reservoir. The durability performance of each seal is measured as the total running hours until an oil leak occurs through the seal on the wear tester shaft. Table 2 shows performance data for six seals at three different amounts of radiation, with formulation 150A not benefiting from the wear package being admixed into its polymeric formulation and with formulation 150AA benefiting from the wear package being admixed into its polymeric formulation.

TABLE 2

| Formulation/Dosage | 150A (hours to failure) | 150AA (hours to failure) |
|---|---|---|
| 0 MeRAD | 140 | 264 |
| 6 MeRAD | 363 | 621 |
| 18 MeRAD | 450 | 380 |

As shown in Table 2, the hours-to-failure generally improve when the sample wafers are irradiated with a dosage of electron beam radiation below 18 MeRAD.

Compression set data at room temperature is shown for the samples in Table 3.

TABLE 3

| Formulation/Dosage | 150A (Room temperature compression set values) | 150AA (Room temperature compression set values) |
|---|---|---|
| 0 MeRAD | 45 | 47 |
| 6 MeRAD | 34 | 37 |
| 18 MeRAD | 29 | 31 |

As shown in Table 3, the compression set values of the formulations consistently improve when the sample wafers are irradiated with a dosage of electron beam radiation below 18 MeRAD.

Compression set data at a temperature of 150 degrees Celsius is shown for the samples in Table 4.

TABLE 4

| Formulation/Dosage | 150A (150 degrees Celsius compression set values) | 150AA (150 degrees Celsius compression set values) |
|---|---|---|
| 0 MeRAD | 72 | 69 |
| 6 MeRAD | 53 | 57 |
| 18 MeRAD | 53 | 57 |

As shown in Table 4, the compression set values of the formulations consistently improve when the sample wafers are irradiated with a dosage of electron beam radiation below 18 MeRAD.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method for making a multilayer composite having a first layer bonded to a second layer, comprising:
   (a) providing said first layer, said first layer having a first layer bonding surface;

(b) providing a solidified halogenated polymer article comprising said second layer, said second layer having a second layer bonding surface adapted for bonding to said first layer bonding surface;
(c) etching said second layer bonding surface with an electron beam to provide an activated bonding surface and thereby converting said solidified halogenated polymer article into an etched halogenated polymer article;
(d) placing said etched halogenated polymer article in an inert environment at a predetermined temperature;
(e) sustaining said etched halogenated polymer article in said inert environment at said predetermined temperature for at least 4 hours; and
(f) compressing said first layer bonding surface against said activated bonding surface to provide said multilayer composite;
(g) wherein said electron beam energizes said second layer bonding surface with sufficient energy for dislodging a plurality of halogen atoms from halogenated polymer of said surface and for generating thereby a set of residual free radical sites in polymeric chains of said surface upon conclusion of said etching; and
(h) said predetermined temperature is not greater than room temperature.

2. A method according to claim 1 wherein said sustaining sustains said etched halogenated polymer article in said inert environment at said predetermined temperature for at least 8 hours.

3. A method according to claim 1 wherein said inert environment comprises a noble gas.

4. A method according to claim 1 wherein said inert environment comprises a noble gas at a pressure of less than 0.1 atmospheres.

5. A method according to claim 1 wherein said inert environment comprises any of nitrogen, an applied vacuum, and a space free of electrical static.

6. A method according to claim 1 wherein said inert environment comprises nitrogen at a pressure of less than 0.1 atmospheres.

7. A method according to claim 1 wherein said generating generates electron beam radiation from about 1 kGy to about 400 kGy.

8. A method according to claim 1 wherein said generating generates electron beam radiation from about 50 kGy to about 200 kGy.

* * * * *